US011769026B2

(12) United States Patent
Chandramowle et al.

(10) Patent No.: US 11,769,026 B2
(45) Date of Patent: *Sep. 26, 2023

(54) FLEXIBLE WATER-RESISTANT SENSOR TAG

(71) Applicant: Sensormatic Electronics, LLC, Boca Raton, FL (US)

(72) Inventors: Gopal Chandramowle, Wellington (IN); David Torrecilla Puertas, Madrid (ES)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/411,900

(22) Filed: Aug. 25, 2021

(65) Prior Publication Data

US 2021/0383180 A1 Dec. 9, 2021

Related U.S. Application Data

(63) Continuation of application No. 17/103,668, filed on Nov. 24, 2020, now Pat. No. 11,132,589, which is a continuation of application No. 16/825,448, filed on Mar. 20, 2020, now Pat. No. 11,055,588.

(60) Provisional application No. 62/941,402, filed on Nov. 27, 2019.

(51) Int. Cl.
| | |
|---|---|
| *G06K 19/06* | (2006.01) |
| *G06K 19/02* | (2006.01) |
| *H01Q 1/22* | (2006.01) |
| *G06K 19/077* | (2006.01) |
| *B42D 25/378* | (2014.01) |
| *C09D 11/52* | (2014.01) |

(52) U.S. Cl.
CPC ......... *G06K 19/025* (2013.01); *B42D 25/378* (2014.10); *G06K 19/07722* (2013.01); *H01Q 1/2225* (2013.01); *C09D 11/52* (2013.01)

(58) Field of Classification Search
CPC .......... G06K 19/025; G06K 19/07722; B42D 25/378; H01Q 1/2225; C09D 11/52
USPC .................................................. 235/487, 492
See application file for complete search history.

(56) References Cited

U.S. PATENT DOCUMENTS

| | | | |
|---|---|---|---|
| 5,963,144 | A | 10/1999 | Kruest |
| 6,147,655 | A | 11/2000 | Roesner |
| 6,152,348 | A | 11/2000 | Finn et al. |
| 6,229,443 | B1 | 5/2001 | Roesner |
| 6,265,976 | B1 | 7/2001 | Roesner |
| 6,646,336 | B1 | 11/2003 | Marmaropoulos et al. |
| 6,690,264 | B2 | 2/2004 | Dalglish |
| 6,967,579 | B1 | 11/2005 | Elizondo |
| 6,982,190 | B2 | 1/2006 | Roesner |

(Continued)

FOREIGN PATENT DOCUMENTS

| | | |
|---|---|---|
| CN | 101523605 A | 9/2009 |
| CN | 101711430 A | 5/2010 |

(Continued)

*Primary Examiner* — Jamara A Franklin
(74) *Attorney, Agent, or Firm* — ArentFox Schiff LLP

(57) ABSTRACT

A method for configuring a sensor tag may include providing a flexible substrate layer comprising a thin film of thermoplastic polyurethane (TPU); depositing a sensor inlay on the flexible substrate layer; and applying a protective coating over the sensor inlay encapsulating the sensor inlay between the flexible substrate layer and the protective coating.

22 Claims, 5 Drawing Sheets

(56) References Cited

U.S. PATENT DOCUMENTS

| | | | |
|---|---|---|---|
| 7,026,935 B2 | 4/2006 | Diorio et al. |
| 7,026,936 B2 | 4/2006 | Roesner |
| 7,030,786 B2 | 4/2006 | Kaplan et al. |
| 7,038,544 B2 | 5/2006 | Diorio et al. |
| 7,038,573 B2 | 5/2006 | Bann |
| 7,038,603 B2 | 5/2006 | Diorio et al. |
| 7,049,964 B2 | 5/2006 | Hyde et al. |
| 7,054,595 B2 | 5/2006 | Bann |
| 7,061,324 B2 | 6/2006 | Diorio et al. |
| 7,064,653 B2 | 6/2006 | Dalglish |
| 7,107,022 B1 | 9/2006 | Thomas et al. |
| 7,116,240 B2 | 10/2006 | Hyde |
| 7,119,664 B2 | 10/2006 | Roesner |
| 7,120,550 B2 | 10/2006 | Diorio et al. |
| 7,123,171 B2 | 10/2006 | Kaplan et al. |
| 7,154,283 B1 | 12/2006 | Weakley et al. |
| 7,158,408 B2 | 1/2007 | Roesner et al. |
| 7,183,926 B2 | 2/2007 | Diorio et al. |
| 7,187,237 B1 | 3/2007 | Diorio et al. |
| 7,187,290 B2 | 3/2007 | Hyde et al. |
| 7,199,456 B2 | 4/2007 | Krappe et al. |
| 7,199,663 B2 | 4/2007 | Diorio et al. |
| 7,212,446 B2 | 5/2007 | Diorio et al. |
| 7,215,251 B2 | 5/2007 | Hyde |
| D543,976 S | 6/2007 | Oliver |
| D546,819 S | 7/2007 | Oliver |
| D546,820 S | 7/2007 | Oliver |
| D546,821 S | 7/2007 | Oliver |
| D546,822 S | 7/2007 | Oliver |
| D547,306 S | 7/2007 | Oliver |
| D547,754 S | 7/2007 | Oliver |
| 7,245,213 B1 | 7/2007 | Esterberg et al. |
| 7,246,751 B2 | 7/2007 | Diorio et al. |
| D548,225 S | 8/2007 | Oliver |
| 7,253,719 B2 | 8/2007 | Diorio et al. |
| 7,253,735 B2 | 8/2007 | Gengel et al. |
| 7,283,037 B2 | 10/2007 | Diorio et al. |
| 7,304,579 B2 | 12/2007 | Diorio et al. |
| 7,307,528 B2 | 12/2007 | Glidden et al. |
| 7,307,529 B2 | 12/2007 | Gutnik et al. |
| 7,307,534 B2 | 12/2007 | Pesavento |
| 7,312,622 B2 | 12/2007 | Hyde et al. |
| D562,810 S | 2/2008 | Oliver |
| D563,397 S | 3/2008 | Oliver |
| 7,375,626 B2 | 5/2008 | Ening |
| 7,380,190 B2 | 5/2008 | Hara et al. |
| D570,337 S | 6/2008 | Oliver |
| 7,382,257 B2 | 6/2008 | Thomas et al. |
| 7,388,468 B2 | 6/2008 | Diorio et al. |
| 7,389,101 B2 | 6/2008 | Diorio et al. |
| 7,391,329 B2 | 6/2008 | Humes et al. |
| 7,394,324 B2 | 7/2008 | Diorio et al. |
| 7,400,255 B2 | 7/2008 | Horch |
| 7,405,659 B1 | 7/2008 | Hyde |
| 7,405,660 B2 | 7/2008 | Diorio et al. |
| D574,369 S | 8/2008 | Oliver |
| D574,370 S | 8/2008 | Oliver |
| 7,408,466 B2 | 8/2008 | Diorio et al. |
| 7,417,548 B2 | 8/2008 | Kavounas et al. |
| 7,419,096 B2 | 9/2008 | Esterberg et al. |
| 7,420,469 B1 | 9/2008 | Oliver |
| 7,423,539 B2 | 9/2008 | Hyde et al. |
| D578,114 S | 10/2008 | Oliver |
| 7,432,814 B2 | 10/2008 | Dietrich et al. |
| 7,436,308 B2 | 10/2008 | Sundstrom et al. |
| 7,448,547 B2 | 11/2008 | Esterberg |
| 7,469,126 B2 | 12/2008 | Miettinen et al. |
| 7,472,835 B2 | 1/2009 | Diorio et al. |
| D586,336 S | 2/2009 | Oliver |
| 7,489,248 B2 | 2/2009 | Gengel et al. |
| 7,492,164 B2 | 2/2009 | Hanhikorpi et al. |
| D587,691 S | 3/2009 | Oliver |
| 7,501,953 B2 | 3/2009 | Diorio et al. |
| 7,510,117 B2 | 3/2009 | Esterberg |
| 7,518,516 B2 | 4/2009 | Azevedo et al. |
| 7,525,438 B2 | 4/2009 | Hyde et al. |
| D592,192 S | 5/2009 | Oliver |
| 7,528,724 B2 | 5/2009 | Horch |
| 7,528,728 B2 | 5/2009 | Oliver et al. |
| 7,541,843 B1 | 6/2009 | Hyde et al. |
| 7,561,866 B2 | 7/2009 | Oliver et al. |
| 7,589,618 B2 | 9/2009 | Diorio et al. |
| 7,592,897 B2 | 9/2009 | Diorio et al. |
| D605,641 S | 12/2009 | Oliver |
| D606,056 S | 12/2009 | Oliver |
| D606,057 S | 12/2009 | Oliver |
| 7,633,376 B2 | 12/2009 | Diorio et al. |
| 7,651,882 B1 | 1/2010 | Bockorick et al. |
| D610,576 S | 2/2010 | Oliver |
| 7,667,231 B2 | 2/2010 | Hyde et al. |
| 7,667,589 B2 | 2/2010 | Desmons et al. |
| D611,037 S | 3/2010 | Oliver |
| 7,679,957 B2 | 3/2010 | Ma et al. |
| D613,276 S | 4/2010 | Oliver |
| 7,696,882 B1 | 4/2010 | Rahimi et al. |
| 7,696,947 B2 | 4/2010 | Gallschuetz et al. |
| 7,714,593 B2 | 5/2010 | Varpula et al. |
| 7,715,236 B2 | 5/2010 | Hyde |
| 7,719,406 B2 | 5/2010 | Bajahr |
| D617,320 S | 6/2010 | Oliver |
| 7,733,227 B1 | 6/2010 | Pesavento et al. |
| D620,484 S | 7/2010 | Oliver |
| D620,928 S | 8/2010 | Oliver |
| 7,768,248 B1 | 8/2010 | Hyde |
| 7,768,406 B1 | 8/2010 | Peach et al. |
| 7,787,837 B2 | 8/2010 | Mikuteit |
| 7,804,411 B2 | 9/2010 | Copeland |
| 7,808,387 B1 | 10/2010 | Kuhn |
| 7,808,823 B2 | 10/2010 | Ma et al. |
| 7,812,729 B2 | 10/2010 | Copeland |
| 7,830,262 B1 | 11/2010 | Diorio et al. |
| 7,830,322 B1 | 11/2010 | Oliver et al. |
| 7,843,399 B2 | 11/2010 | Stobbe |
| 7,872,582 B1 | 1/2011 | Diorio |
| 7,884,725 B2 | 2/2011 | Kruest et al. |
| 7,907,899 B1 | 3/2011 | Oliver |
| 7,917,088 B2 | 3/2011 | Hyde et al. |
| 7,920,046 B1 | 4/2011 | Aiouaz et al. |
| 7,969,364 B2 | 6/2011 | Kriebel et al. |
| 7,973,643 B2 | 7/2011 | Hyde et al. |
| 7,973,645 B1 | 7/2011 | Moretti et al. |
| 7,973,661 B2 | 7/2011 | Copeland |
| 7,975,414 B2 | 7/2011 | Ritamäki et al. |
| 7,978,005 B1 | 7/2011 | Hyde et al. |
| 7,982,611 B1 | 7/2011 | Picasso et al. |
| 7,990,249 B1 | 8/2011 | Hyde et al. |
| 7,994,897 B2 | 8/2011 | Azevedo et al. |
| 7,999,675 B2 | 8/2011 | Diorio et al. |
| 3,044,774 A1 | 10/2011 | Diorio |
| 8,028,923 B2 | 10/2011 | Shafran et al. |
| 8,044,801 B1 | 10/2011 | Hyde et al. |
| 8,056,814 B2 | 11/2011 | Martin et al. |
| 8,063,740 B1 | 11/2011 | Diorio et al. |
| 8,072,327 B2 | 12/2011 | Enyedy et al. |
| 8,072,329 B1 | 12/2011 | Srinivas et al. |
| 8,072,332 B2 | 12/2011 | Forster |
| 8,077,013 B2 | 12/2011 | Cooper |
| 8,082,556 B1 | 12/2011 | Aiouaz et al. |
| 8,093,617 B2 | 1/2012 | Vicard et al. |
| 8,093,996 B2 | 1/2012 | Heurtier |
| 8,098,134 B2 | 1/2012 | Azevedo et al. |
| 8,115,590 B1 | 2/2012 | Diorio et al. |
| 8,115,597 B1 | 2/2012 | Oliver et al. |
| 8,115,632 B1 | 2/2012 | Rahimi et al. |
| 8,120,494 B1 | 2/2012 | Aiouaz et al. |
| 8,134,451 B1 | 3/2012 | Diorio |
| 8,154,385 B2 | 4/2012 | Aiouaz et al. |
| 8,174,367 B1 | 5/2012 | Diorio |
| 8,179,265 B2 | 5/2012 | Elizondo et al. |
| 8,188,867 B2 | 5/2012 | Rietzler |
| 8,188,927 B1 | 5/2012 | Koepp et al. |
| 8,193,912 B1 | 6/2012 | Gutnik et al. |
| 8,201,748 B2 | 6/2012 | Koepp et al. |
| 8,224,610 B2 | 7/2012 | Diorio et al. |

(56) References Cited

U.S. PATENT DOCUMENTS

| | | |
|---|---|---|
| 8,228,175 B1 | 7/2012 | Diorio et al. |
| 8,237,562 B1 | 8/2012 | Picasso et al. |
| 8,244,201 B2 | 8/2012 | Oliver et al. |
| 8,258,918 B1 | 9/2012 | Diorio et al. |
| 8,258,955 B1 | 9/2012 | Hyde et al. |
| 8,260,241 B1 | 9/2012 | Hyde |
| 8,279,045 B2 | 10/2012 | Diorio et al. |
| 8,294,582 B1 | 10/2012 | Humes et al. |
| 8,303,389 B2 | 11/2012 | Wilm |
| 8,305,764 B2 | 11/2012 | Rietzler |
| 8,325,014 B1 | 12/2012 | Sundstrom et al. |
| 8,325,042 B1 | 12/2012 | Hyde et al. |
| 8,326,256 B1 | 12/2012 | Kuhn |
| 8,334,751 B2 | 12/2012 | Azevedo et al. |
| 8,342,402 B2 | 1/2013 | Kriebel et al. |
| 8,344,857 B1 | 1/2013 | Oliver et al. |
| 8,350,665 B1 | 1/2013 | Sundstrom et al. |
| 8,350,702 B2 | 1/2013 | Copeland et al. |
| 8,354,917 B2 | 1/2013 | Diorio et al. |
| 8,390,425 B1 | 3/2013 | Cooper et al. |
| 8,390,430 B1 | 3/2013 | Sundstrom et al. |
| 8,390,431 B1 | 3/2013 | Diorio |
| 8,391,785 B2 | 3/2013 | Hyde et al. |
| 8,427,315 B2 | 4/2013 | Aiouaz et al. |
| 8,428,515 B1 | 4/2013 | Oliver |
| 8,446,258 B2 | 5/2013 | Diorio et al. |
| 8,448,874 B2 | 5/2013 | Koskelainen |
| 8,451,095 B2 | 5/2013 | Azevedo et al. |
| 8,451,119 B1 | 5/2013 | Rahimi et al. |
| 8,451,673 B1 | 5/2013 | Pesavento et al. |
| 8,471,708 B1 | 6/2013 | Diorio et al. |
| 8,471,773 B2 | 6/2013 | Vicard et al. |
| 8,511,569 B1 | 8/2013 | Koepp et al. |
| 8,536,075 B2 | 9/2013 | Leonard |
| 8,570,157 B1 | 10/2013 | Diorio et al. |
| 8,587,411 B1 | 11/2013 | Diorio |
| 8,593,257 B1 | 11/2013 | Diorio et al. |
| D695,278 S | 12/2013 | Koskelainen |
| 8,600,298 B1 | 12/2013 | Hyde et al. |
| 8,610,580 B2 | 12/2013 | Elizondo et al. |
| 8,614,506 B1 | 12/2013 | Fassett et al. |
| 8,616,459 B2 | 12/2013 | Sykko et al. |
| 8,661,652 B1 | 3/2014 | Koepp et al. |
| 8,665,074 B1 | 3/2014 | Diorio et al. |
| 8,669,872 B1 | 3/2014 | Stanford et al. |
| 8,669,874 B2 | 3/2014 | Kruest et al. |
| 8,680,973 B2 | 3/2014 | Kruest et al. |
| 8,698,629 B1 | 4/2014 | Stanford et al. |
| 8,717,145 B2 | 5/2014 | Ho et al. |
| D710,337 S | 8/2014 | Koskelainen |
| 8,796,865 B1 | 8/2014 | Fassett et al. |
| 8,810,376 B1 | 8/2014 | Picasso et al. |
| 8,814,054 B2 | 8/2014 | Brun et al. |
| 8,816,909 B2 | 8/2014 | Jiang et al. |
| 8,830,038 B2 | 9/2014 | Stanford et al. |
| 8,830,064 B1 | 9/2014 | Stanford et al. |
| 8,830,065 B1 | 9/2014 | Stanford et al. |
| 8,866,594 B1 | 10/2014 | Diorio et al. |
| 8,866,595 B1 | 10/2014 | Diorio et al. |
| 8,866,596 B1 | 10/2014 | Diorio et al. |
| 8,872,636 B1 | 10/2014 | Diorio et al. |
| 8,881,373 B1 | 11/2014 | Koepp et al. |
| 8,902,627 B1 | 12/2014 | Pesavento et al. |
| 8,907,795 B1 | 12/2014 | Soto et al. |
| 8,917,179 B2 | 12/2014 | Alicot et al. |
| 8,917,219 B2 | 12/2014 | Semar et al. |
| 8,952,792 B1 | 2/2015 | Srinivas et al. |
| 8,967,486 B2 | 3/2015 | Chandramowle et al. |
| 8,988,199 B1 | 3/2015 | Moretti et al. |
| 8,991,714 B2 | 3/2015 | Elizondo et al. |
| 8,998,097 B2 | 4/2015 | Auniainen |
| 9,000,835 B1 | 4/2015 | Peach et al. |
| D729,780 S | 5/2015 | Koskelainen et al. |
| 9,024,729 B1 | 5/2015 | Diorio et al. |
| 9,024,731 B1 | 5/2015 | Diorio et al. |
| 9,031,504 B1 | 5/2015 | Hyde et al. |
| 9,035,748 B2 | 5/2015 | Greefkes |
| 9,053,400 B2 | 6/2015 | Diorio et al. |
| 9,058,554 B2 | 6/2015 | Kervinen et al. |
| 9,064,196 B1 | 6/2015 | Gutnik et al. |
| 9,064,199 B2 | 6/2015 | Nitta |
| 9,070,066 B1 | 6/2015 | Oliver et al. |
| 9,076,049 B1 | 7/2015 | Moretti et al. |
| 9,087,281 B2 | 7/2015 | Maguire et al. |
| 9,087,282 B1 | 7/2015 | Hyde et al. |
| 9,104,923 B1 | 8/2015 | Stanford et al. |
| 9,111,283 B1 | 8/2015 | Diorio et al. |
| 9,129,168 B1 | 9/2015 | Diorio et al. |
| 9,129,169 B1 | 9/2015 | Diorio et al. |
| 9,135,476 B2 | 9/2015 | Virtanen |
| 9,142,881 B1 | 9/2015 | Oliver et al. |
| 9,165,170 B1 | 10/2015 | Gutnik et al. |
| 9,178,277 B1 | 11/2015 | Moretti et al. |
| 9,183,717 B1 | 11/2015 | Diorio et al. |
| 9,189,904 B1 | 11/2015 | Diorio et al. |
| 9,197,294 B2 | 11/2015 | Alicot et al. |
| 9,202,093 B2 | 12/2015 | Nummila et al. |
| 9,213,870 B1 | 12/2015 | Diorio et al. |
| 9,213,871 B1 | 12/2015 | Diorio et al. |
| 9,215,809 B2 | 12/2015 | Nieland et al. |
| 9,239,941 B1 | 1/2016 | Diorio |
| 9,247,634 B2 | 1/2016 | Kruest et al. |
| 9,253,876 B2 | 2/2016 | Elizondo et al. |
| 9,281,552 B2 | 3/2016 | Virtanen |
| 9,299,586 B1 | 3/2016 | West et al. |
| 9,305,195 B1 | 4/2016 | Diorio et al. |
| 9,317,799 B1 | 4/2016 | Koepp et al. |
| 9,325,053 B2 | 4/2016 | Mrtanen et al. |
| 9,330,284 B1 | 5/2016 | Diorio |
| 9,342,775 B2 | 5/2016 | Forster |
| 9,349,032 B1 | 5/2016 | Diorio et al. |
| 9,349,090 B1 | 5/2016 | Srinivas et al. |
| 9,373,012 B2 | 6/2016 | Pesavento et al. |
| 9,390,603 B2 | 7/2016 | Li et al. |
| 9,405,945 B1 | 8/2016 | Diorio et al. |
| 9,430,683 B1 | 8/2016 | Hyde |
| 9,454,680 B1 | 9/2016 | Diorio |
| 9,460,380 B1 | 10/2016 | Koepp et al. |
| 9,471,816 B1 | 10/2016 | Hyde et al. |
| 9,489,611 B1 | 11/2016 | Diorio et al. |
| 9,495,631 B1 | 11/2016 | Koepp et al. |
| 9,501,675 B1 | 11/2016 | Diorio et al. |
| 9,501,736 B2 | 11/2016 | Elizondo et al. |
| 9,503,160 B1 | 11/2016 | Hyde |
| 9,542,636 B2 | 1/2017 | Buehler |
| 9,565,022 B1 | 2/2017 | Robshaw et al. |
| 9,582,690 B2 | 2/2017 | Rietzler |
| 9,589,224 B2 | 3/2017 | Patterson et al. |
| 9,607,191 B1 | 3/2017 | Peach et al. |
| 9,607,286 B1 | 3/2017 | Diorio |
| 9,626,619 B2 | 4/2017 | Kruest et al. |
| 9,633,302 B1 | 4/2017 | Heinrich |
| 9,646,186 B1 | 5/2017 | Hyde et al. |
| 9,652,643 B1 | 5/2017 | Pesavento et al. |
| 9,690,949 B1 | 6/2017 | Diorio et al. |
| 9,691,243 B1 | 6/2017 | Diorio et al. |
| 9,697,387 B1 | 7/2017 | Bowman et al. |
| 9,715,605 B1 | 7/2017 | Sundstrom et al. |
| 9,740,891 B1 | 8/2017 | Robshaw et al. |
| 9,747,542 B2 | 8/2017 | Elizondo et al. |
| 9,767,333 B1 | 9/2017 | Diorio et al. |
| 9,773,133 B2 | 9/2017 | Oliver et al. |
| 9,773,201 B2 | 9/2017 | Shafran et al. |
| 9,779,599 B2 | 10/2017 | Sharpy et al. |
| 9,792,472 B1 | 10/2017 | Robshaw et al. |
| 9,792,543 B2 | 10/2017 | Kuschewski et al. |
| 9,805,223 B1 | 10/2017 | Bowman et al. |
| 9,805,235 B2 | 10/2017 | Kruest et al. |
| 9,818,084 B1 | 11/2017 | Diorio et al. |
| 9,831,724 B2 | 11/2017 | Copeland et al. |
| 9,846,794 B2 | 12/2017 | Greefkes |
| 9,846,833 B1 | 12/2017 | Koepp et al. |
| 9,852,319 B1 | 12/2017 | Pesavento et al. |
| 9,875,438 B1 | 1/2018 | Diorio et al. |

(56) References Cited

U.S. PATENT DOCUMENTS

| | | |
|---|---|---|
| 9,881,186 B1 | 1/2018 | Sundstrom et al. |
| 9,881,473 B1 | 1/2018 | Diorio et al. |
| 9,886,658 B1 | 2/2018 | Stanford et al. |
| 9,887,843 B1 | 2/2018 | Robshaw et al. |
| 9,911,017 B2 | 3/2018 | Uhl et al. |
| 9,911,018 B1 | 3/2018 | Heinrich et al. |
| 9,916,483 B1 | 3/2018 | Robshaw et al. |
| 9,916,484 B2 | 3/2018 | Pesavento et al. |
| 9,922,215 B2 | 3/2018 | Huhtasalo et al. |
| 9,928,388 B1 | 3/2018 | Bowman et al. |
| 9,928,390 B1 | 3/2018 | Diorio et al. |
| 9,940,490 B1 | 4/2018 | Robshaw et al. |
| 9,953,198 B2 | 4/2018 | Kohler et al. |
| 9,954,278 B1 | 4/2018 | Moretti et al. |
| 9,959,435 B1 | 5/2018 | Diorio et al. |
| 9,959,494 B1 | 5/2018 | Shyamkumar et al. |
| 9,977,932 B2 | 5/2018 | Rietzler |
| 10,002,266 B1 | 6/2018 | Hyde et al. |
| 10,013,587 B1 | 7/2018 | Pesavento et al. |
| 10,037,444 B1 | 7/2018 | Sundstrom et al. |
| 10,043,046 B1 | 8/2018 | Robshaw et al. |
| 10,049,317 B1 | 8/2018 | Diorio et al. |
| 10,061,950 B1 | 8/2018 | Pesavento et al. |
| 10,068,167 B2 | 9/2018 | Huhtasalo |
| 10,084,597 B1 | 9/2018 | Robshaw et al. |
| 10,116,033 B1 | 10/2018 | Koepp et al. |
| 10,121,033 B1 | 11/2018 | Robshaw et al. |
| 10,133,894 B2 | 11/2018 | Kruest et al. |
| 10,146,969 B1 | 12/2018 | Diorio et al. |
| 10,169,625 B1 | 1/2019 | Diorio et al. |
| 10,186,127 B1 | 1/2019 | Diorio et al. |
| 10,204,245 B1 | 2/2019 | Diorio et al. |
| 10,204,246 B1 | 2/2019 | Maguire et al. |
| 10,235,545 B2 | 3/2019 | Kruest et al. |
| 10,262,167 B2 | 4/2019 | Nyalamadugu et al. |
| 10,311,351 B1 | 6/2019 | Diorio et al. |
| 10,311,353 B1 | 6/2019 | Diorio et al. |
| 10,325,125 B1 | 6/2019 | Pesavento et al. |
| 10,331,993 B1 | 6/2019 | Koepp et al. |
| 10,339,436 B2 | 7/2019 | Huhtasalo |
| 10,373,038 B1 | 8/2019 | Stanford |
| 10,373,115 B1 | 8/2019 | Diorio et al. |
| 10,402,710 B1 | 9/2019 | Diorio et al. |
| 10,417,085 B1 | 9/2019 | Diorio |
| 10,417,464 B2 | 9/2019 | Huhtasalo et al. |
| 10,430,623 B1 | 10/2019 | Pesavento et al. |
| 10,445,535 B1 | 10/2019 | Hyde et al. |
| D865,726 S | 11/2019 | Oliver |
| 10,474,851 B2 | 11/2019 | Greefkes |
| RE47,755 E | 12/2019 | Hyde et al. |
| 10,521,768 B1 | 12/2019 | Diorio et al. |
| 10,546,162 B1 | 1/2020 | Diorio |
| 10,558,828 B2 | 2/2020 | Martinez De Velasco Cortina et al. |
| 10,572,703 B1 | 2/2020 | Shyamkumar et al. |
| 10,572,789 B1 | 2/2020 | Stanford et al. |
| D879,077 S | 3/2020 | Oliver |
| 10,600,298 B1 | 3/2020 | Diorio et al. |
| 10,650,201 B1 | 5/2020 | Maguire et al. |
| 10,650,202 B1 | 5/2020 | Robshaw et al. |
| 10,650,346 B1 | 5/2020 | Pesavento et al. |
| 10,664,670 B1 | 5/2020 | Diorio et al. |
| D887,400 S | 6/2020 | Oliver |
| 10,679,019 B1 | 6/2020 | Thomas et al. |
| 10,679,115 B2 | 6/2020 | Huhtasalo |
| 10,699,178 B1 | 6/2020 | Diorio et al. |
| 10,713,453 B1 | 7/2020 | Diorio et al. |
| 10,713,549 B1 | 7/2020 | Peach et al. |
| 10,719,671 B1 | 7/2020 | Robshaw et al. |
| 10,720,700 B1 | 7/2020 | Moretti et al. |
| 10,733,395 B1 | 8/2020 | Diorio et al. |
| 10,740,574 B1 | 8/2020 | Stanford et al. |
| 10,776,198 B1 | 9/2020 | Diorio |
| 10,783,424 B1 | 9/2020 | Trivelpiece et al. |
| 10,790,160 B2 | 9/2020 | Singleton et al. |
| 10,819,319 B1 | 10/2020 | Hyde |
| 10,824,824 B1 | 11/2020 | Diorio |
| 10,846,583 B1 | 11/2020 | Koepp et al. |
| 10,860,819 B1 | 12/2020 | Pesavento et al. |
| 10,878,371 B1 | 12/2020 | Stanford et al. |
| 10,878,685 B1 | 12/2020 | Diorio et al. |
| 10,885,417 B1 | 1/2021 | Stanford et al. |
| 10,885,421 B1 | 1/2021 | Diorio et al. |
| 10,902,308 B2 | 1/2021 | Gire et al. |
| 10,916,114 B1 | 2/2021 | Diorio et al. |
| 10,929,734 B1 | 2/2021 | Hyde et al. |
| 10,936,929 B1 | 3/2021 | Diorio et al. |
| 10,956,693 B1 | 3/2021 | Shyamkumar et al. |
| 10,995,523 B2 | 5/2021 | Claeys et al. |
| 11,017,187 B1 | 5/2021 | Thomas et al. |
| 11,017,349 B1 | 5/2021 | Diorio et al. |
| 11,024,936 B1 | 6/2021 | Koepp et al. |
| 11,062,190 B1 | 7/2021 | Diorio et al. |
| 11,107,034 B1 | 8/2021 | Pesavento et al. |
| D929,975 S | 9/2021 | Abdul Rahman |
| 11,120,320 B1 | 9/2021 | Robshaw et al. |
| 11,132,589 B2 | 9/2021 | Chandramowle et al. |
| 11,188,803 B1 | 11/2021 | Patil et al. |
| 11,200,387 B1 | 12/2021 | Stanford et al. |
| 11,232,340 B1 | 1/2022 | Diorio et al. |
| 11,244,282 B1 | 2/2022 | Diorio et al. |
| 11,259,443 B1 | 2/2022 | T. Kunasekaran et al. |
| 11,282,357 B2 | 3/2022 | Claeys et al. |
| 11,288,564 B1 | 3/2022 | Koepp et al. |
| 11,300,467 B2 | 4/2022 | Boellaard et al. |
| 11,321,547 B1 | 5/2022 | Pesavento et al. |
| 11,341,343 B1 | 5/2022 | Diorio |
| 11,341,837 B1 | 5/2022 | Diorio et al. |
| 11,361,174 B1 | 6/2022 | Robshaw et al. |
| 11,403,505 B1 | 8/2022 | Diorio et al. |
| 11,423,278 B1 | 8/2022 | Koepp et al. |
| 11,443,160 B2 | 9/2022 | Trivelpiece et al. |
| 11,461,570 B1 | 10/2022 | Shyamkumar et al. |
| 11,481,591 B1 | 10/2022 | Peach et al. |
| 11,481,592 B1 | 10/2022 | Diorio et al. |
| 11,514,254 B1 | 11/2022 | Diorio |
| 11,514,255 B1 | 11/2022 | Thomas et al. |
| 11,519,200 B2 | 12/2022 | Claeys et al. |
| 2001/0034063 A1 | 10/2001 | Saunders et al. |
| 2002/0088154 A1 | 7/2002 | Sandt et al. |
| 2002/0097143 A1 | 7/2002 | Dalglish |
| 2003/0136503 A1 | 7/2003 | Green et al. |
| 2004/0026754 A1 | 2/2004 | Liu et al. |
| 2004/0125040 A1 | 7/2004 | Ferguson et al. |
| 2004/0192011 A1 | 9/2004 | Roesner |
| 2004/0195593 A1 | 10/2004 | Diorio et al. |
| 2004/0200061 A1 | 10/2004 | Coleman et al. |
| 2005/0001785 A1 | 1/2005 | Ferguson et al. |
| 2005/0052281 A1 | 3/2005 | Bann |
| 2005/0054293 A1 | 3/2005 | Bann |
| 2005/0057341 A1 | 3/2005 | Roesner |
| 2005/0058292 A1 | 3/2005 | Diorio et al. |
| 2005/0068179 A1 | 3/2005 | Roesner |
| 2005/0068180 A1 | 3/2005 | Miettinen et al. |
| 2005/0093690 A1 | 5/2005 | Miglionico |
| 2005/0099269 A1 | 5/2005 | Diorio et al. |
| 2005/0099270 A1 | 5/2005 | Diorio et al. |
| 2005/0140448 A1 | 6/2005 | Diorio et al. |
| 2005/0140449 A1 | 6/2005 | Diorio et al. |
| 2005/0162233 A1 | 7/2005 | Diorio et al. |
| 2005/0185460 A1 | 8/2005 | Roesner et al. |
| 2005/0200402 A1 | 9/2005 | Diorio et al. |
| 2005/0200415 A1 | 9/2005 | Diorio et al. |
| 2005/0200416 A1 | 9/2005 | Diorio et al. |
| 2005/0200417 A1 | 9/2005 | Diorio et al. |
| 2005/0212674 A1 | 9/2005 | Desmons et al. |
| 2005/0223286 A1 | 10/2005 | Forster |
| 2005/0225433 A1 | 10/2005 | Diorio et al. |
| 2005/0225434 A1 | 10/2005 | Diorio et al. |
| 2005/0225435 A1 | 10/2005 | Diorio et al. |
| 2005/0225436 A1 | 10/2005 | Diorio et al. |
| 2005/0225447 A1 | 10/2005 | Diorio et al. |
| 2005/0237157 A1 | 10/2005 | Cooper et al. |
| 2005/0237158 A1 | 10/2005 | Cooper et al. |

(56) References Cited

U.S. PATENT DOCUMENTS

| | | |
|---|---|---|
| 2005/0237159 A1 | 10/2005 | Cooper et al. |
| 2005/0237162 A1 | 10/2005 | Hyde et al. |
| 2005/0237843 A1 | 10/2005 | Hyde |
| 2005/0237844 A1 | 10/2005 | Hyde |
| 2005/0240369 A1 | 10/2005 | Diorio et al. |
| 2005/0240370 A1 | 10/2005 | Diorio et al. |
| 2005/0240739 A1 | 10/2005 | Pesavento |
| 2005/0269408 A1 | 12/2005 | Esterberg et al. |
| 2005/0270141 A1 | 12/2005 | Dalglish |
| 2005/0270185 A1 | 12/2005 | Esterberg |
| 2005/0270189 A1 | 12/2005 | Kaplan et al. |
| 2005/0275533 A1 | 12/2005 | Hanhikorpi et al. |
| 2005/0280505 A1 | 12/2005 | Humes et al. |
| 2005/0280506 A1 | 12/2005 | Lobanov et al. |
| 2005/0280507 A1 | 12/2005 | Diorio et al. |
| 2005/0282495 A1 | 12/2005 | Forster |
| 2006/0033622 A1 | 2/2006 | Hyde et al. |
| 2006/0043198 A1 | 3/2006 | Forster |
| 2006/0044769 A1 | 3/2006 | Forster et al. |
| 2006/0049917 A1 | 3/2006 | Hyde et al. |
| 2006/0049928 A1 | 3/2006 | Ening |
| 2006/0055620 A1 | 3/2006 | Oliver et al. |
| 2006/0063323 A1 | 3/2006 | Munn |
| 2006/0071758 A1 | 4/2006 | Cooper et al. |
| 2006/0071759 A1 | 4/2006 | Cooper et al. |
| 2006/0071793 A1 | 4/2006 | Pesavento |
| 2006/0071796 A1 | 4/2006 | Korzeniewski |
| 2006/0082442 A1 | 4/2006 | Sundstrom |
| 2006/0086810 A1 | 4/2006 | Diorio et al. |
| 2006/0098765 A1 | 5/2006 | Thomas et al. |
| 2006/0125505 A1 | 6/2006 | Glidden et al. |
| 2006/0125506 A1 | 6/2006 | Hara et al. |
| 2006/0125507 A1 | 6/2006 | Hyde et al. |
| 2006/0125508 A1 | 6/2006 | Glidden et al. |
| 2006/0125641 A1 | 6/2006 | Forster |
| 2006/0133140 A1 | 6/2006 | Gutnik et al. |
| 2006/0133175 A1 | 6/2006 | Gutnik et al. |
| 2006/0145710 A1 | 7/2006 | Puleston et al. |
| 2006/0145855 A1 | 7/2006 | Diorio et al. |
| 2006/0145861 A1 | 7/2006 | Forster et al. |
| 2006/0145864 A1 | 7/2006 | Jacober et al. |
| 2006/0163370 A1 | 7/2006 | Diorio et al. |
| 2006/0164214 A1 | 7/2006 | Bajahr |
| 2006/0186960 A1 | 8/2006 | Diorio et al. |
| 2006/0187031 A1 | 8/2006 | Moretti et al. |
| 2006/0187094 A1 | 8/2006 | Kaplan et al. |
| 2006/0197668 A1 | 9/2006 | Oliver et al. |
| 2006/0199551 A1 | 9/2006 | Thomas et al. |
| 2006/0202705 A1 | 9/2006 | Forster |
| 2006/0202831 A1 | 9/2006 | Horch |
| 2006/0206277 A1 | 9/2006 | Horch |
| 2006/0211386 A1 | 9/2006 | Thomas et al. |
| 2006/0220639 A1 | 10/2006 | Hyde |
| 2006/0220865 A1 | 10/2006 | Babine et al. |
| 2006/0221715 A1 | 10/2006 | Ma et al. |
| 2006/0224647 A1 | 10/2006 | Gutnik |
| 2006/0226982 A1 | 10/2006 | Forster |
| 2006/0226983 A1 | 10/2006 | Forster et al. |
| 2006/0236203 A1 | 10/2006 | Diorio et al. |
| 2006/0238345 A1 | 10/2006 | Ferguson et al. |
| 2006/0244598 A1 | 11/2006 | Hyde et al. |
| 2006/0250245 A1 | 11/2006 | Forster |
| 2006/0250246 A1 | 11/2006 | Forster |
| 2006/0252182 A1 | 11/2006 | Wang et al. |
| 2006/0261952 A1 | 11/2006 | Kavounas et al. |
| 2006/0261953 A1 | 11/2006 | Diorio et al. |
| 2006/0261954 A1 | 11/2006 | Dietrich et al. |
| 2006/0261955 A1 | 11/2006 | Humes et al. |
| 2006/0261956 A1 | 11/2006 | Sundstrom et al. |
| 2006/0271328 A1 | 11/2006 | Forster |
| 2006/0273170 A1 | 12/2006 | Forster et al. |
| 2007/0001856 A1 | 1/2007 | Diorio et al. |
| 2007/0008238 A1 | 1/2007 | Liu et al. |
| 2007/0024446 A1 | 2/2007 | Hyde et al. |
| 2007/0035466 A1 | 2/2007 | Coleman et al. |
| 2007/0039687 A1 | 2/2007 | Hamilton et al. |
| 2007/0046432 A1 | 3/2007 | Aiouaz et al. |
| 2007/0052613 A1 | 3/2007 | Gallschuetz et al. |
| 2007/0060075 A1 | 3/2007 | Mikuteit |
| 2007/0085685 A1 | 4/2007 | Phaneuf et al. |
| 2007/0109129 A1 | 5/2007 | Sundstrom et al. |
| 2007/0126584 A1 | 6/2007 | Hyde et al. |
| 2007/0136583 A1 | 6/2007 | Diorio et al. |
| 2007/0136584 A1 | 6/2007 | Diorio et al. |
| 2007/0136585 A1 | 6/2007 | Diorio et al. |
| 2007/0141760 A1 | 6/2007 | Ferguson et al. |
| 2007/0144662 A1 | 6/2007 | Armijo et al. |
| 2007/0152073 A1 | 7/2007 | Esterberg |
| 2007/0156281 A1 | 7/2007 | Leung et al. |
| 2007/0164851 A1 | 7/2007 | Cooper |
| 2007/0171129 A1 | 7/2007 | Coleman et al. |
| 2007/0172966 A1 | 7/2007 | Hyde et al. |
| 2007/0177738 A1 | 8/2007 | Diorio et al. |
| 2007/0180009 A1 | 8/2007 | Gutnik |
| 2007/0216533 A1 | 9/2007 | Hyde et al. |
| 2007/0218571 A1 | 9/2007 | Stoughton et al. |
| 2007/0220737 A1 | 9/2007 | Stoughton et al. |
| 2007/0221737 A2 | 9/2007 | Diorio et al. |
| 2007/0236331 A1 | 10/2007 | Thompson et al. |
| 2007/0236335 A1 | 10/2007 | Aiouaz et al. |
| 2007/0241762 A1 | 10/2007 | Varpula et al. |
| 2007/0296590 A1 | 12/2007 | Diorio et al. |
| 2007/0296603 A1 | 12/2007 | Diorio et al. |
| 2008/0006702 A2 | 1/2008 | Diorio et al. |
| 2008/0018489 A1 | 1/2008 | Kruest et al. |
| 2008/0024273 A1 | 1/2008 | Kruest et al. |
| 2008/0030342 A1 | 2/2008 | Elizondo et al. |
| 2008/0046492 A1 | 2/2008 | Sundstrom |
| 2008/0048833 A1 | 2/2008 | Oliver |
| 2008/0048867 A1 | 2/2008 | Oliver et al. |
| 2008/0084275 A1 | 4/2008 | Azevedo et al. |
| 2008/0094214 A1 | 4/2008 | Azevedo et al. |
| 2008/0136602 A1 | 6/2008 | Ma et al. |
| 2008/0180217 A1 | 7/2008 | Isabell |
| 2008/0180255 A1 | 7/2008 | Isabell |
| 2008/0197978 A1 | 8/2008 | Diorio et al. |
| 2008/0197979 A1 | 8/2008 | Enyedy et al. |
| 2008/0204195 A1 | 8/2008 | Diorio et al. |
| 2008/0232883 A1 | 9/2008 | Klein et al. |
| 2008/0232894 A1 | 9/2008 | Neuhard |
| 2008/0258878 A1 | 10/2008 | Dietrich et al. |
| 2008/0258916 A1 | 10/2008 | Diorio et al. |
| 2008/0266098 A1 | 10/2008 | Aiouaz et al. |
| 2008/0297421 A1 | 12/2008 | Kriebel et al. |
| 2008/0314990 A1 | 12/2008 | Rietzler |
| 2008/0315992 A1 | 12/2008 | Forster |
| 2009/0002132 A1 | 1/2009 | Diorio et al. |
| 2009/0015382 A1 | 1/2009 | Greefkes |
| 2009/0027173 A1 | 1/2009 | Forster |
| 2009/0033495 A1 | 2/2009 | Abraham et al. |
| 2009/0038735 A1 | 2/2009 | Kian |
| 2009/0065592 A1* | 3/2009 | Paul ................ G06F 21/77 235/492 |
| 2009/0091424 A1 | 4/2009 | Rietzler |
| 2009/0123704 A1 | 5/2009 | Shafran et al. |
| 2009/0146785 A1 | 6/2009 | Forster |
| 2009/0184824 A1 | 7/2009 | Forster |
| 2009/0189770 A1 | 7/2009 | Wirrig et al. |
| 2009/0194588 A1 | 8/2009 | Blanchard, Jr. et al. |
| 2009/0200066 A1 | 8/2009 | Vicard et al. |
| 2009/0212919 A1 | 8/2009 | Selgrath et al. |
| 2009/0237220 A1 | 9/2009 | Oliver et al. |
| 2009/0251293 A1 | 10/2009 | Azevedo et al. |
| 2010/0032900 A1 | 2/2010 | Wilm |
| 2010/0033297 A1 | 2/2010 | Patovirta |
| 2010/0050487 A1 | 3/2010 | Weightman et al. |
| 2010/0060456 A1 | 3/2010 | Forster |
| 2010/0060459 A1 | 3/2010 | Stole et al. |
| 2010/0079286 A1 | 4/2010 | Phaneuf |
| 2010/0079287 A1 | 4/2010 | Forster et al. |
| 2010/0079290 A1 | 4/2010 | Phaneuf |
| 2010/0126000 A1 | 5/2010 | Forster |
| 2010/0155492 A1 | 6/2010 | Forster |
| 2010/0156640 A1 | 6/2010 | Forster |

(56) References Cited

U.S. PATENT DOCUMENTS

| | | |
|---|---|---|
| 2010/0182129 A1 | 7/2010 | Hyde et al. |
| 2010/0226107 A1 | 9/2010 | Rietzler |
| 2010/0245182 A1 | 9/2010 | Vicard et al. |
| 2010/0259392 A1 | 10/2010 | Chamandy et al. |
| 2010/0270382 A1 | 10/2010 | Koepp et al. |
| 2011/0000970 A1 | 1/2011 | Abraham |
| 2011/0062236 A1 | 3/2011 | Kriebel et al. |
| 2011/0114734 A1 | 5/2011 | Tiedmann et al. |
| 2011/0121082 A1 | 5/2011 | Phaneuf |
| 2011/0121972 A1 | 5/2011 | Phaneuf et al. |
| 2011/0155811 A1 | 6/2011 | Rietzler |
| 2011/0155813 A1 | 6/2011 | Forster |
| 2011/0160548 A1 | 6/2011 | Forster |
| 2011/0163849 A1 | 7/2011 | Kruest et al. |
| 2011/0163879 A1 | 7/2011 | Kruest et al. |
| 2011/0175735 A1 | 7/2011 | Forster |
| 2011/0185607 A1 | 8/2011 | Forster et al. |
| 2011/0253794 A1 | 10/2011 | Koskelainen |
| 2011/0256357 A1 | 10/2011 | Forster |
| 2011/0267254 A1 | 11/2011 | Semar et al. |
| 2011/0285511 A1 | 11/2011 | Maguire et al. |
| 2011/0289023 A1 | 11/2011 | Forster et al. |
| 2011/0289647 A1 | 12/2011 | Chiao et al. |
| 2011/0307309 A1 | 12/2011 | Forster et al. |
| 2012/0019358 A1 | 1/2012 | Azevedo et al. |
| 2012/0038461 A1 | 2/2012 | Forster |
| 2012/0050011 A1 | 3/2012 | Forster |
| 2012/0061473 A1 | 3/2012 | Forster et al. |
| 2012/0118975 A1 | 5/2012 | Forster |
| 2012/0154121 A1 | 6/2012 | Azevedo et al. |
| 2012/0164405 A1 | 6/2012 | Webb et al. |
| 2012/0173440 A1 | 7/2012 | Dehlinger et al. |
| 2012/0175621 A1 | 7/2012 | Backlund et al. |
| 2012/0182147 A1 | 7/2012 | Forster |
| 2012/0234921 A1 | 9/2012 | Tiedmann et al. |
| 2012/0235870 A1 | 9/2012 | Forster |
| 2012/0261477 A1 | 10/2012 | Elizondo et al. |
| 2012/0274448 A1 | 11/2012 | Marcus et al. |
| 2012/0279100 A1 | 11/2012 | Burout et al. |
| 2012/0290440 A1 | 11/2012 | Hoffman et al. |
| 2012/0292399 A1 | 11/2012 | Auniainen |
| 2013/0059534 A1 | 3/2013 | Sobalvarro et al. |
| 2013/0075481 A1 | 3/2013 | Raymond et al. |
| 2013/0082113 A1 | 4/2013 | Cooper |
| 2013/0092742 A1 | 4/2013 | Brun et al. |
| 2013/0105586 A1 | 5/2013 | Sykköet al. |
| 2013/0107042 A1 | 5/2013 | Forster |
| 2013/0113627 A1 | 5/2013 | Tiedmann |
| 2013/0135080 A1 | 5/2013 | Virtanen |
| 2013/0135104 A1 | 5/2013 | Nikkanen |
| 2013/0141222 A1 | 6/2013 | Garcia |
| 2013/0161382 A1 | 6/2013 | Bauer et al. |
| 2013/0163640 A1 | 6/2013 | Aiouaz et al. |
| 2013/0265139 A1 | 10/2013 | Nummila et al. |
| 2013/0277432 A1 | 10/2013 | Katworapattra et al. |
| 2013/0285795 A1 | 10/2013 | Mrtanen et al. |
| 2013/0291375 A1 | 11/2013 | Mrtanen et al. |
| 2014/0070010 A1 | 3/2014 | Diorio et al. |
| 2014/0070923 A1 | 3/2014 | Forster et al. |
| 2014/0073071 A1 | 3/2014 | Diorio et al. |
| 2014/0084460 A1 | 3/2014 | Nieland et al. |
| 2014/0103119 A1 | 4/2014 | Elizondo et al. |
| 2014/0111314 A1 | 4/2014 | Rietzler |
| 2014/0144992 A1 | 5/2014 | Diorio et al. |
| 2014/0158777 A1 | 6/2014 | Gladstone |
| 2014/0191043 A1 | 7/2014 | Forster |
| 2014/0209694 A1 | 7/2014 | Forster |
| 2014/0263655 A1 | 9/2014 | Forster |
| 2014/0263659 A1 | 9/2014 | Kervinen et al. |
| 2014/0266633 A1 | 9/2014 | Marcus |
| 2014/0317909 A1 | 10/2014 | Virtanen |
| 2015/0022323 A1 | 1/2015 | Kruest et al. |
| 2015/0024523 A1 | 1/2015 | Virtanen |
| 2015/0032569 A1 | 1/2015 | Stromberg |
| 2015/0048170 A1 | 2/2015 | Forster |
| 2015/0076238 A1 | 3/2015 | Koskelainen |
| 2015/0107092 A1 | 4/2015 | Bashan et al. |
| 2015/0115038 A1 | 4/2015 | Kuschewski et al. |
| 2015/0181696 A1 | 6/2015 | Elizondo et al. |
| 2015/0227832 A1 | 8/2015 | Diorio et al. |
| 2015/0235062 A1 | 8/2015 | Greefkes |
| 2015/0248604 A1 | 9/2015 | Diorio et al. |
| 2015/0262053 A1 | 9/2015 | Buehler |
| 2015/0328871 A1 | 11/2015 | de Castro |
| 2015/0351689 A1 | 12/2015 | Adams et al. |
| 2015/0353292 A1 | 12/2015 | Roth |
| 2015/0356395 A1 | 12/2015 | Haring et al. |
| 2016/0006115 A1* | 1/2016 | Etzkorn ................. H01Q 1/273 29/601 |
| 2016/0019452 A1 | 1/2016 | Forster |
| 2016/0027022 A1 | 1/2016 | Benoit et al. |
| 2016/0034728 A1 | 2/2016 | Oliver et al. |
| 2016/0042206 A1 | 2/2016 | Pesavento |
| 2016/0137396 A1 | 5/2016 | Brownfield |
| 2016/0154618 A1 | 6/2016 | Duckett |
| 2016/0157348 A1 | 6/2016 | Elizondo et al. |
| 2016/0162776 A1 | 6/2016 | Kruest et al. |
| 2016/0172742 A1 | 6/2016 | Forster |
| 2016/0172743 A1 | 6/2016 | Forster |
| 2016/0189020 A1 | 6/2016 | Duckett et al. |
| 2016/0203395 A1 | 7/2016 | Huhtasalo |
| 2016/0214422 A1 | 7/2016 | Deyoung et al. |
| 2016/0233188 A1 | 8/2016 | Kriebel et al. |
| 2016/0253732 A1 | 9/2016 | Brown |
| 2016/0321479 A1 | 11/2016 | Uhl et al. |
| 2016/0336198 A1 | 11/2016 | Singleton et al. |
| 2016/0342821 A1 | 11/2016 | Nyalamadugu et al. |
| 2016/0342883 A1 | 11/2016 | Huhtasalo |
| 2016/0364589 A1 | 12/2016 | Roth |
| 2017/0011664 A1 | 1/2017 | Forster et al. |
| 2017/0068882 A1 | 3/2017 | Elizondo et al. |
| 2017/0091498 A1 | 3/2017 | Forster et al. |
| 2017/0098393 A1 | 4/2017 | Duckett et al. |
| 2017/0124363 A1 | 5/2017 | Rietzler |
| 2017/0161601 A1 | 6/2017 | Sevaux |
| 2017/0169263 A1 | 6/2017 | Kohler et al. |
| 2017/0235982 A1 | 8/2017 | Kruest et al. |
| 2017/0243032 A1 | 8/2017 | Pesavento et al. |
| 2017/0286819 A9 | 10/2017 | Huhtasalo |
| 2017/0305068 A1 | 10/2017 | Caldwell et al. |
| 2017/0364716 A1 | 12/2017 | Huhtasalo et al. |
| 2018/0032774 A1 | 2/2018 | Kruest et al. |
| 2018/0096176 A1 | 4/2018 | Greefkes |
| 2018/0101759 A1 | 4/2018 | Forster |
| 2018/0121690 A1 | 5/2018 | Forster et al. |
| 2018/0123220 A1 | 5/2018 | Forster |
| 2018/0137314 A1 | 5/2018 | Roth |
| 2018/0157873 A1 | 6/2018 | Roth |
| 2018/0157874 A1 | 6/2018 | Huhtasalo et al. |
| 2018/0157879 A1 | 6/2018 | Forster |
| 2018/0165485 A1 | 6/2018 | Martinez De Velasco Cortina et al. |
| 2018/0268175 A1 | 9/2018 | Rietzler |
| 2018/0336383 A1 | 11/2018 | Roth |
| 2019/0026616 A1 | 1/2019 | Bourque et al. |
| 2019/0057289 A1 | 2/2019 | Bauer et al. |
| 2019/0087705 A1 | 3/2019 | Bourque et al. |
| 2019/0147773 A1 | 5/2019 | Cockerell |
| 2019/0205724 A1 | 7/2019 | Roth |
| 2019/0220724 A1 | 7/2019 | Huhtasalo |
| 2019/0244072 A1 | 8/2019 | Forster |
| 2019/0251411 A1 | 8/2019 | Gire et al. |
| 2019/0266464 A1 | 8/2019 | Forster |
| 2019/0389613 A1 | 12/2019 | Colarossi |
| 2019/0391560 A1 | 12/2019 | Arene et al. |
| 2020/0006840 A1 | 1/2020 | Forster |
| 2020/0051463 A1 | 2/2020 | Melo |
| 2020/0126454 A1 | 4/2020 | Sevaux |
| 2020/0134408 A1 | 4/2020 | Law |
| 2020/0151401 A1 | 5/2020 | Dyche et al. |
| 2020/0160142 A1 | 5/2020 | Roth |
| 2020/0193260 A1 | 6/2020 | Forster |
| 2020/0193261 A1 | 6/2020 | de Backer |
| 2020/0193455 A1 | 6/2020 | Hoffman et al. |

(56) References Cited

U.S. PATENT DOCUMENTS

| | | |
|---|---|---|
| 2020/0202294 A1 | 6/2020 | Duckett et al. |
| 2020/0207116 A1 | 7/2020 | Raphael et al. |
| 2020/0249109 A1 | 8/2020 | Singleton et al. |
| 2020/0265446 A1 | 8/2020 | Vargas |
| 2020/0335475 A1 | 10/2020 | Rolland et al. |
| 2020/0381829 A1 | 12/2020 | Andia Vera et al. |
| 2020/0394697 A1 | 12/2020 | Paolella et al. |
| 2021/0215562 A1 | 7/2021 | Boellaard et al. |
| 2021/0241063 A1 | 8/2021 | Thirappa et al. |
| 2021/0312471 A1 | 10/2021 | Iyer |
| 2022/0012439 A1 | 1/2022 | Duckett et al. |
| 2022/0171951 A1 | 6/2022 | Vargas et al. |
| 2022/0180014 A1 | 6/2022 | Barr et al. |
| 2022/0196500 A1 | 6/2022 | Singleton et al. |
| 2022/0215353 A1 | 7/2022 | Duckett |
| 2022/0230134 A1 | 7/2022 | Pursell et al. |
| 2022/0269919 A1 | 8/2022 | de Backer |
| 2022/0277152 A1 | 9/2022 | Forster |
| 2022/0284253 A1 | 9/2022 | Garcia et al. |
| 2022/0318532 A1 | 10/2022 | Roth |
| 2022/0358337 A1 | 11/2022 | Diorio et al. |
| 2022/0358339 A1 | 11/2022 | Forster et al. |
| 2022/0358340 A1 | 11/2022 | Sowle et al. |
| 2022/0391654 A1 | 12/2022 | Forster |
| 2022/0398424 A1 | 12/2022 | Forster |
| 2022/0398425 A1 | 12/2022 | Roth |
| 2022/0414356 A1 | 12/2022 | Roth |
| 2022/0414411 A1 | 12/2022 | Forster |

FOREIGN PATENT DOCUMENTS

| | | |
|---|---|---|
| CN | 103080392 A | 5/2013 |
| CN | 110326100 A | 10/2019 |
| CN | 110945716 A | 3/2020 |
| DE | 102006051379 A1 | 4/2008 |
| DE | 102007001411 A1 | 7/2008 |
| EP | 2057687 A1 | 5/2009 |
| EP | 2158604 A2 | 3/2010 |
| EP | 2585628 A1 | 5/2013 |
| EP | 3319168 A1 | 5/2018 |
| EP | 3574521 A1 | 12/2019 |
| EP | 3662534 A1 | 6/2020 |
| EP | 3923195 A1 | 12/2021 |
| FR | 2905518 A1 | 3/2008 |
| FR | 2917895 A1 | 12/2008 |
| FR | 2961947 A1 | 12/2011 |
| FR | 3058579 A1 | 5/2018 |
| FR | 3062515 A1 | 8/2018 |
| FR | 3069962 A1 | 2/2019 |
| FR | 3078980 A1 | 9/2019 |
| FR | 3103043 A1 | 5/2021 |
| FR | 3103044 A1 | 5/2021 |
| FR | 3103630 A1 | 5/2021 |
| JP | 2010502030 A | 1/2010 |
| JP | 2010530630 A | 9/2010 |
| JP | 5059110 B2 | 10/2012 |
| JP | 2013529807 A | 7/2013 |
| JP | 5405457 B2 | 2/2014 |
| JP | 5815692 B2 | 11/2015 |
| JP | 2020505714 A | 2/2020 |
| WO | 2007104634 A1 | 9/2007 |
| WO | 2008025889 A1 | 3/2008 |
| WO | 2009004243 A2 | 1/2009 |
| WO | 2011161336 A1 | 12/2011 |
| WO | 2018138437 A1 | 8/2018 |
| WO | 2019025683 A1 | 2/2019 |
| WO | 2019175509 A1 | 9/2019 |

* cited by examiner

FLEXIBLE WATER-RESISTANT SENSOR TAG

CROSS-REFERENCE TO RELATED APPLICATION(S)

This application is a Continuation of U.S. Non-Provisional application Ser. No. 17/103,668, entitled "FLEXIBLE WATER-RESISTANT SENSOR TAG" and filed Nov. 24, 2020, which is a Continuation of U.S. Non-Provisional application Ser. No. 16/825,448, entitled "FLEXIBLE WATER-RESISTANT SENSOR TAG" and filed Mar. 20, 2020, which claims the benefit of U.S. Provisional Application Ser. No. 62/941,402, entitled "FLEXIBLE WATER-RESISTANT SENSOR TAG" and filed on Nov. 27, 2019, and U.S. Provisional Application Ser. No. 62/939,757, entitled "FLEXIBLE WATER-RESISTANT SENSOR TAG" and filed on Nov. 25, 2019, which are expressly incorporated by reference herein in each of their entirety.

FIELD

The present disclosure relates generally to sensor tags (e.g., Radio Frequency Identification (RFID) tags) which may be attached to or incorporated into textile or other items. More particularly, the present disclosure relates to a thin, flexible sensor tag having a water resistant coating.

BACKGROUND

In the retail industry, it would be advantageous to provide sensor tags, such as RFID tags, which can be attached to textile or other items so that the sensor tag becomes an integrated (and difficult to detect) part of the item. In some aspects, for example, it would also be advantageous to provide a sensor tag for garments and the like that is designed to be attached to the garment permanently. Such a tag would need to be highly water resistant so as to be impervious to repeated washings.

One drawback of tagging goods with RFID and other sensor devices for purposes of theft prevention is that the tag itself is often visible to thieves. Shoplifters in many cases are able to locate the RFID tag and simply remove, disable, or shield an RFID element to evade detection by exit portal RFID readers.

A less obtrusive, smaller, and harder to detect RFID solution is needed, in particular due to the increasing importance of a Radio Frequency Identification (RFID) technology for retail logistics.

Some known systems use electronic thread technologies allowing for electronics to be integrated into textiles. In one aspect, microelectronic components (such as RFID chips) may be attached to a fabric using conductive thread (e-thread) which is woven into the fabric. The e-thread provides the metal antenna for the RFID chip. In another aspect, a pattern of conductive ink may be applied to fabric to create an electronic circuit including electronic components attached to the fabric. Yet another aspect allows fully-functional, self-contained electronic components to be entirely sheathed within a segment of thread or yarn. These segments of thread or yarn may be woven into the textiles. In one example, an RFID chip, antennas, and associated energy-harvesting circuitry may be included within a segment of thread or yarn. In still other examples, other loss prevention technologies may be included within a portion of thread or yarn.

It would be highly advantageous to insert an RFID tag and antenna directly into the textile product/clothing garment that is intended to be protected by the RFID tag. As described above, known techniques include sheathing the RFID component into a thread or yarn that can be sewn into the cloth. However, it has been difficult and requires a special machine to install the thread into the clothing. In order to have physical strength, the wire is coated by a thick coating. This causes the thread to be felt by someone touching the garment, and the thread can be seen after the garment has been ironed. In addition, the cost of this solution is high. The RFID-containing wires in the current solutions are thick and do not meet the customer needs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for providing sensor tags that are sealed and flexible.

In an aspect, a method for configuring a sensor tag includes printing one or more antennas on a flexible substrate layer using a conductive ink; depositing one or more sensors on the flexible substrate layer, where at least one of the one or more sensors is deposited to make electric contact with at least one of the one or more antennas; and applying a coating layer over the one or more sensors.

In another aspect, a sensor tag includes a flexible substrate layer; one or more antennas printed on the flexible substrate layer using a conductive ink; one or more sensors deposited on the flexible substrate layer, where at least one of the one or more sensors is deposited to make electric contact with at least one of the one or more antennas; and a coating layer applied over the one or more sensors.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide a sensor tag, such as a passive RFID tag, which is thin, flexible, and highly water-resistant, and can be discreetly attached to or otherwise incorporated into many different types of items. The flexible, water-resistant sensor tag is particularly suitable to be incorporated into textile items, such as garments, and can be discreetly disposed within the item so as to be concealed from view. The sensor tag can be submersed in water without damage to the sensor inlay, and can withstand repeated laundering.

Turning now to the figures, example aspects are depicted with reference to one or more components described herein, where components in dashed lines may be optional.

Figure 1:
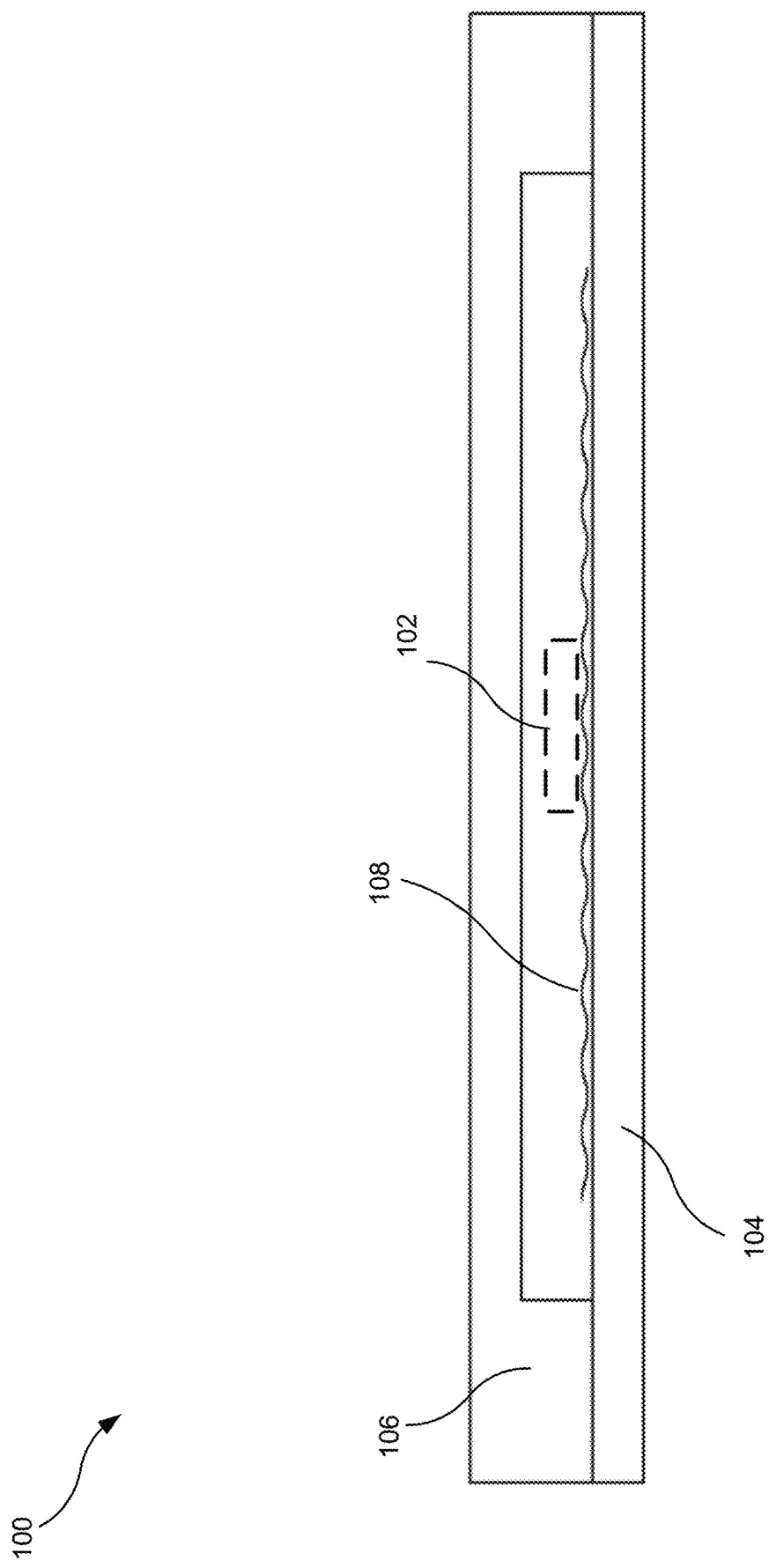
FIG. 1 is a schematic diagram of a first example sensor tag according to some present aspects.

Referring to FIG. 1, in one non-limiting aspect, a flexible, water-resistant sensor tag 100 includes a sensor 102 disposed between a flexible substrate layer 104 and a coating layer 106. In some aspects, the sensor 102 may be an RFID sensor. However, the present aspects are not limited to an RFID sensor, and any combination and number of different sensors within a single sensor tag may be desirable for each specific application. For example, in some aspects, the sensor 102 may include more than one sensor, and each sensor may be an RFID sensor or may be another type of sensor. In some non-limiting aspects, for example, the sensor 102 may include one or more Electronic Article Surveillance (EAS) sensors instead of or in addition to one or more RFID sensors, and each EAS sensor may emit a detectable signal in response to an interrogation field. In some non-limiting aspects, for example, the sensor 102 may include one or more Near-field communication (NFC) and/or one or more acousto-magnetic (AM) sensors instead of or in addition to one or more RFID sensors and/or one or more EAS sensors.

In an aspect, for example, the sensor 102 may include an RFID inlay including an integrated circuit (IC) connected to an antenna 108. The RFID inlay may be affixed/applied to the flexible substrate layer 104, which may have a polymer thick film composition. In one non-limiting aspect, for example, the flexible substrate layer 104 may be made of thermoplastic polyurethane (TPU). In one non-limiting aspect, the antenna 108 may be printed onto the TPU substrate using conductive ink. Then, a second protective polymer layer preferably made of a flexible material such as TPU may be applied as a protective overcoat over the sensor 102 to provide the coating layer 106. Accordingly, a sealed encapsulating TPU layer is formed to house the RFID inlay.

In an alternative aspect, the flexible substrate layer 104 may be made of fabric, woven cloth, or any other type of flexible, sew-able material. In some aspects, a stretchable, semi-elastic type of cloth fabric may be particularly suitable for the flexible substrate later 106. The sensor 102 may be applied to the fabric substrate, and then a thin, protective polymer layer, such as TPU, may be applied over the fabric substrate to seal the RFID inlay between the fabric and the TPU.

Figure 2:
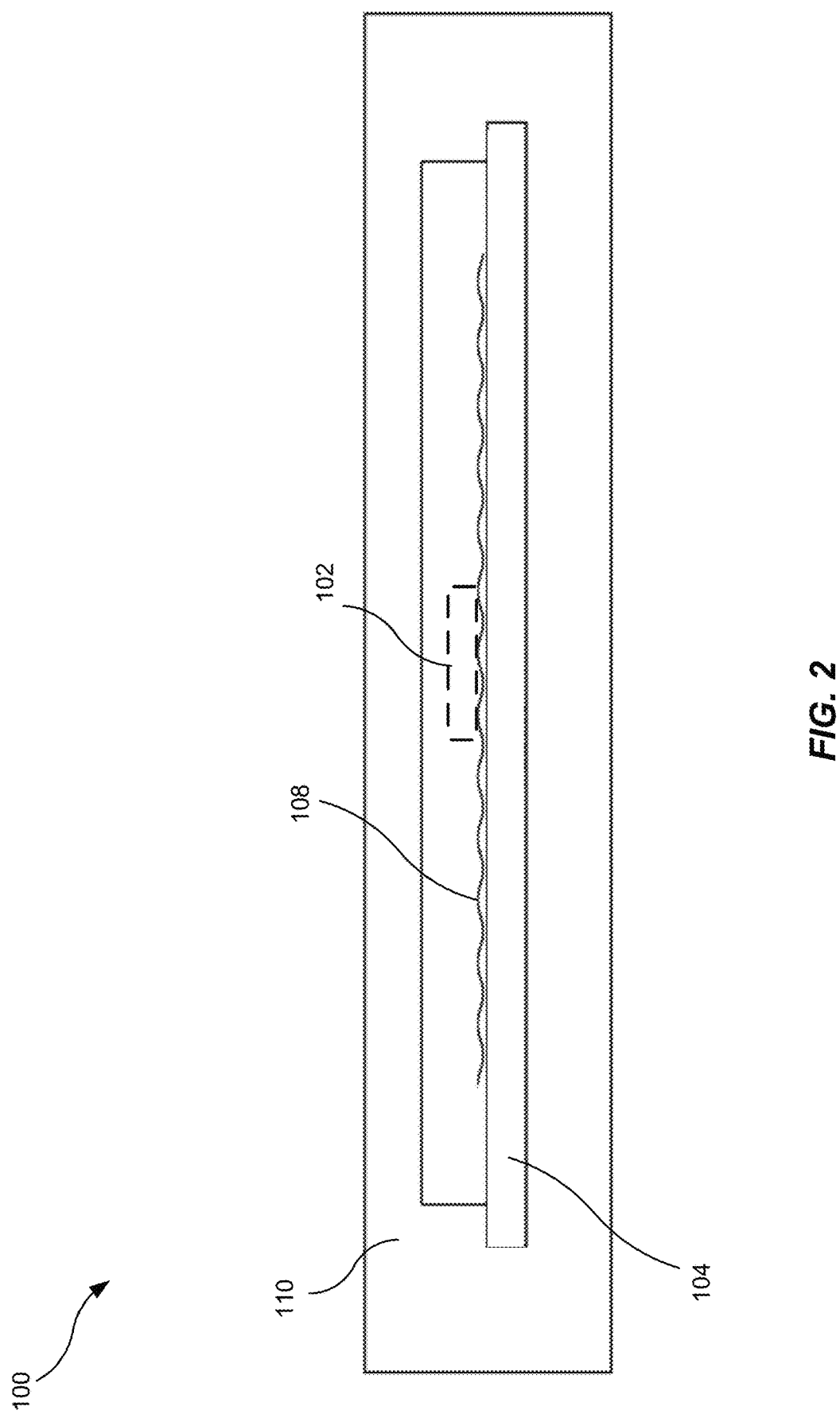
FIG. 2 is a schematic diagram of a second example sensor tag according to some present aspects.

As described above, a TPU layer may be applied to provide the coating layer 106 over the RFID inlay. Alternatively, referring to FIG. 2, in aspects where the flexible substrate layer 104 is made of fabric, a TPU coating may be applied to both sides of the fabric substrate to provide an encapsulating layer 110 that provides a protective, sealed, water-resistant housing for the electronic components applied to the fabric substrate. In some non-limiting aspects, the encapsulating layer 110 is a protective coating layer of TPU that can be positioned on the fabric substrate so that the sensor tag 100 has an edge portion providing a TPU-free margin. This edge portion which does not have a TPU coating may be used as the sewing edge when the sensor tag 100 is sewn into the garment.

In aspects where fabric is used for the flexible substrate layer 104, conductive inks may be used to print the antenna 108 directly on the fabric. Alternatively, the fabric may include conductive threads which are woven into the fabric to provide the antenna 108. In some aspects, the conductive thread may be woven into the fabric to provide some degree of elasticity so that the conductive traces are stretchable.

Figure 3:
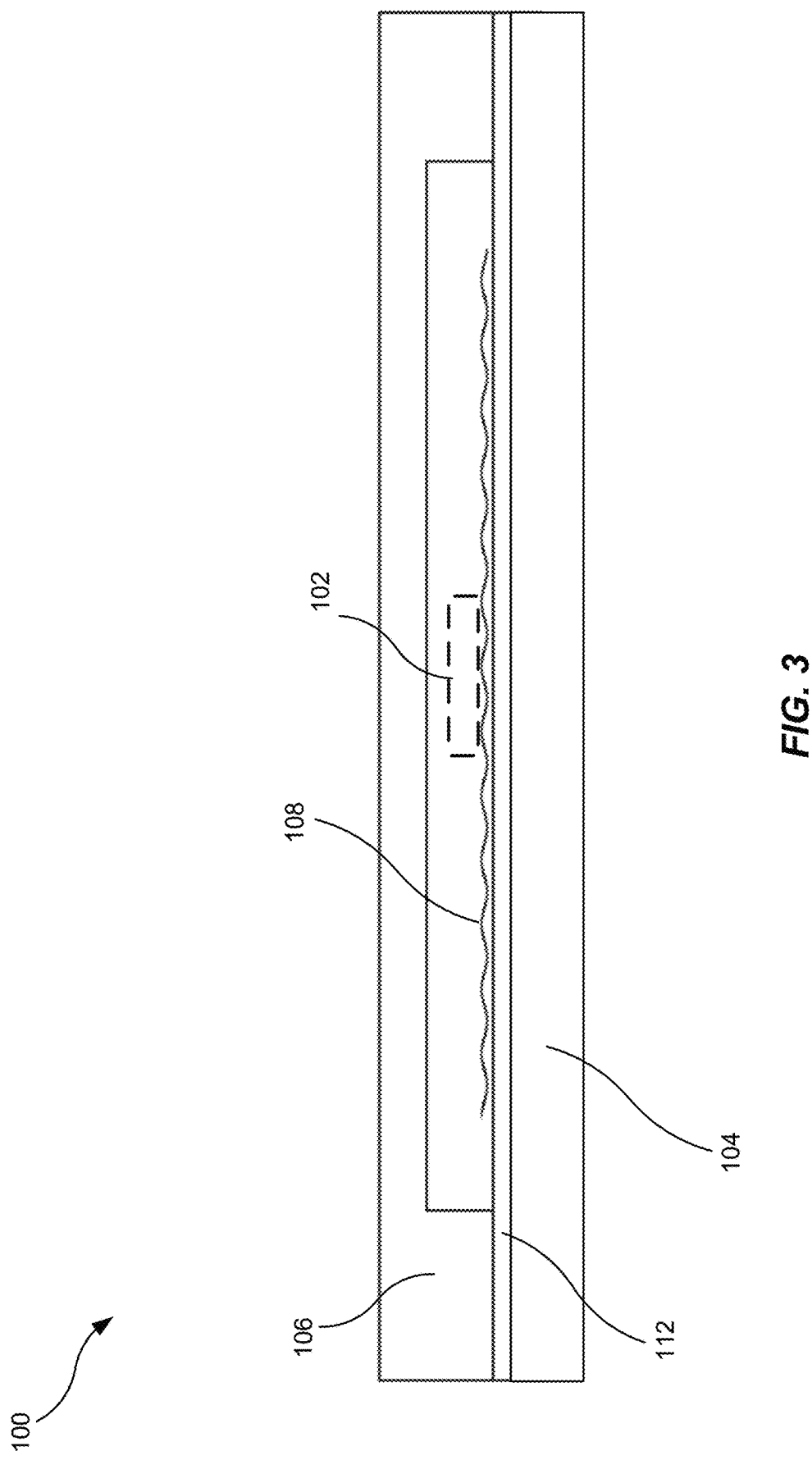
FIG. 3 is a schematic diagram of a third example sensor tag according to some present aspects.

Referring to FIG. 3, in yet another alternative aspect, the flexible substrate layer 104 may be made of fabric, or any other type of flexible, sew-able material, and the flexible substrate layer 104 may have a thin film of TPU 112 applied to at least one side such that the TPU film 112 provides a substrate for the application of the sensor 102. After the electronic components (e.g., the sensor 102, the antenna 108, etc.) are applied to the TPU film 112, another layer of TPU may be applied to provide the coating layer 106 and thereby encapsulate the sensor 102 between two TPU layers: (1) the coating layer 106; and (2) the TPU film 112 on the fabric substrate. In some aspects, the TPU film 112 and/or the coating layer 106 may be positioned on the fabric substrate such that the sensor tag 100 has a fabric edge portion providing a TPU-free margin. This edge portion which does not have a TPU coating may be used as the sewing edge when the sensor tag 100 is sewn into a garment.

In the present aspects, the sensor tag 100 may be flexible, bendable, stretchable, or otherwise configured/constructed to sustain deformations. Also, the flexibility of the sensor tag 100 allows for the sensor tag 100 to be constructed and arranged so that the aforementioned deformations do not negatively affect the functionality and operation of the electronic components disposed within the sensor tag 100 (e.g., the sensor 102, the antenna 108, etc.).

In some aspects, the sensor tag 100 may be manufactured to satisfy standards of environmental sustainability. For example, in some aspects, a natural-fiber fabric may be used as the flexible substrate layer 104 (or as a portion of the flexible substrate layer 104) so that the sensor tag 100 incorporates less plastic material than conventional sensor tags. For example, the sensor tag 100 may be manufactured using natural-fiber fabric substrates that are sustainable in nature, particularly if the fabric is non-polyester. In some alternative aspects, the flexible fabric substrate may be made of a textile manufactured from recycled plastics, thus allowing the sensor tag 100 to be manufactured to satisfy sustainability requirements.

As described herein, in some aspects, the sensor 102 disposed in the sensor tag 100 may be any type of sensor. For example, in an aspect, the sensor 102 may be an EAS sensor or an RFID sensor. In some further aspects, the sensor tag 100 may include more than one sensor of the same type or of different types. For example, referring to FIG. 4, in one non-limiting aspect, the sensor tag 100 may include a first sensor 114 and a second sensor 116, where the first sensor is an RFID sensor and the second sensor 116 is an EAS sensor. Accordingly, the sensor tag 100 has dual technology functionality (both RFID and EAS).

In an aspect, the EAS sensor may be a sensor of the type used in Acousto Magnetic (AM) systems. In one non-limiting aspect, for example, the detectors in an AM system emit periodic bursts at 58 KHz, which causes a detectable resonant response in an AM tag. A security tag in a 58 KHz system may also be implemented as an electric circuit resonant at 58 kHz. In an aspect, the EAS sensor to be incorporated into the sensor tag 100 may have a small and substantially flat form factor, and may have a degree of flexibility.

Figure 4:
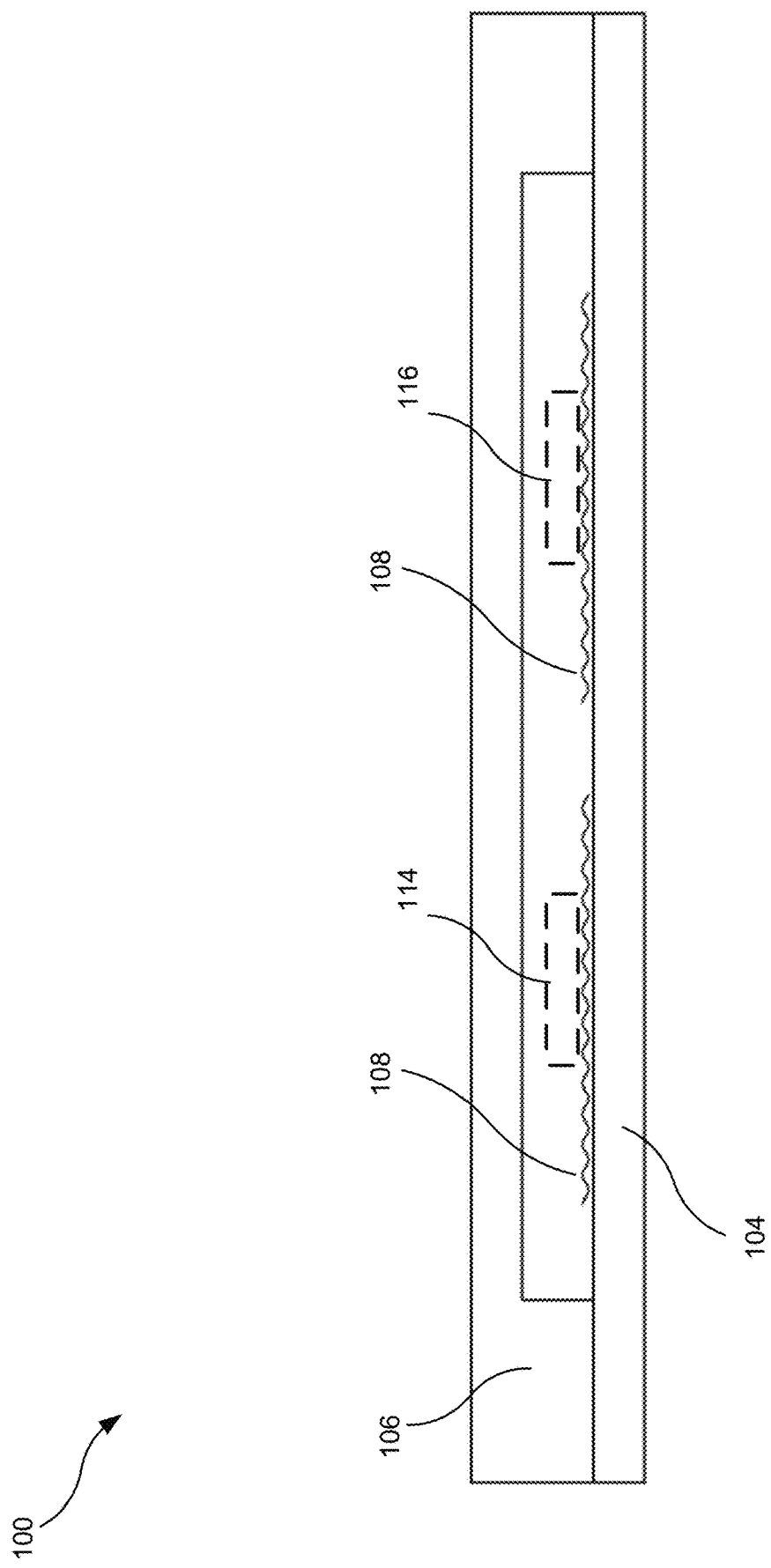
FIG. 4 is a schematic diagram of a fourth example sensor tag according to some present aspects.

In FIG. 4, in order to manufacture the sensor tag 100, both the first sensor 114 and the second sensor 116 may be applied to the flexible substrate layer 104. Then, a coating layer 106 of TPU may be applied onto both the first sensor 114 and the second sensor 116 to provide a sealing layer of TPU coating.

In some aspects, the sensor tag 100 described herein with reference to various aspects may be configured to be flexible and also impervious to detergents, water, grease, oil, dirt, harsh chemicals, etc. In some non-limiting aspects, for example, the sensor 102 within the sensor tag 100 includes an RFID inlay that provides flexibility so that the chip and antenna of the RFID inlay can be repeatedly stretched and deformed without damaging the functionality of the sensor 102.

In some non-limiting aspects, the sensor tag 100 described herein with reference to various aspects may be attached to, or otherwise incorporated into, any type of apparel and garments, handbags, belts, shoes, caps, hats, scarves, ties and other accessory items, etc. For example, in one non-limiting aspect, the sensor tag 100 may be hidden behind the seams of running shoes. The sensor tag 100 may also be used for household-type textiles, such as bed furnishings, window curtains, pillows, furniture cushions, blinds, table cloths, napkins, etc. The sensor tag 100 may also be incorporated into camping tents and textile utility items, such as tarps. The sensor tag 100 is also suitable for application to rubber or plastic goods. While the sensor tag 100 may be particularly suitable for attachment to goods of a flexible, pliant nature (such as textiles), the sensor tag 100 may also be attached to hard goods. In an aspect, for example, in use with hard goods, the sensor tag 100 may be positioned in an interior portion of an item, such as an inaccessible interior cavity. It will be understood that a list of possible applications for the sensor tag 100 would be exhaustive in nature, and are not limited to those mentioned herein.

In some aspects, the sensor tag 100 described herein with reference to various aspects may be integrated into an item in such a way that the sensor tag 100 is hidden or wholly undetectable when attached to the item. For example the sensor tag 100 may be discretely sewn into a garment. The sensor tag 100 may also be disposed in the hem, in a seam, in a shirt collar, in a waistband, etc. The sensor tag 100 may be constructed using a soft, flexible substrate (e.g., TPU and/or fabric) and a sealing layer which is a flexible material coating (e.g., TPU). Since the sensor tag 100 is soft and flexible, a person wearing or handling the item to which the sensor tag 100 is attached may not feel the presence of the sensor tag 100. This also ensures that the sensor tag 100 will not irritate a person's skin by continued contact with protruding components.

In some aspects, the sensor tag 100 described herein with reference to various aspects may also be constructed to visually blend with an article. For example, if a fabric substrate is used, the fabric substrate may be chosen to be the same color as the item to which the sensor tag 100 is attached. The flexible fluid resistive material lay may be a colored TPU material which matches the color of item to which the sensor tag 100 is attached. In some aspects, the sensor tag 100 may also be suitable for integration into a brand label since the TPU can be colorless or can be a specific color that merges with a background color and be discrete. For example, in an aspect, the brand logo may be thermal printed on one side of a brand label, and the sensor tag 100 may be heat sealed to the opposite side of the brand label. Since the sensor tag 100 is configured to avoid bleed through into the substrate, the application of the sensor tag 100 to the brand label will not disturb the brand logo.

In some aspects, after application to an item, the sensor tag 100 described herein with reference to various aspects may be used in many different types of systems where data communication with the sensor tag 100 is desired. In an aspect, for example, the sensor tag 100 may be configured to facilitate inventory management. In this regard, the sensor tag 100 may be configured for allowing data to be exchanged with an external device, such as a tag reader, via wireless communication technology. In addition to the RFID inlay and the EAS sensor described above, the electronics incorporated into the textile may enable any suitable radio communications protocol for a given mode of use, such as Short Range Communications (SRC), Near Field Communication (NFC), Bluetooth, ZigBee, etc.

In one non-limiting aspect, for example, the sensor tag 100 described herein with reference to various aspects may include an RFID sensor, and the presence of the sensor tag 100 within a garment may be a part of a Return Authenticity system as may be implemented by a retailer. In another non-limiting aspect, for example, the data communications capability of the sensor tag 100 may also be utilized by individuals who have purchased the item to which the sensor tag 100 is attached. The durability of the sensor tag 100 may allow for utilizing the sensor tag 100, which remains embedded within the item to which the sensor tag 100 is attached, long after the item has been purchased. To this end, the sensor tag 100 may be configured to withstand multiple wash/dry cycles as would occur during normal use of a tagged garment.

For example, in one non-limiting aspect, a tag reader device may be used in a household environment to read data from the sensor tag 100, thus enabling a person to precisely locate a certain item using a tag reader device. In another aspect, for example, a home closet may be configured to read the tags of garments located within the closet, thus allowing an individual to instantly electronically inventory their own personal belongings.

In an aspect, the sensor tag 100 described herein with reference to various aspects may be configured to conform to privacy laws regarding personal consumer data, which may vary by jurisdiction. For example, in European Union (EU) countries, consumer data collection needs to comply with the General Data Protection Regulation (GDPR). In this case, the sensor tag 100 may be brought into GDPR compliance by selecting an RFID chip which is GDPR compliant.

The use of TPU material as described herein provides a sensor tag 100 having high degree of flexibility as compared to conventional tags which use polyethylene terephthalate (PET) as a substrate. The sensor tag 100 described herein with reference to various aspects may tolerate extreme deformation stresses in applications were conventional tags with PET substrates are not sufficiently elastic.

As described herein, in some aspects, the sensor tag 100 may incorporate TPU as both the inlay substrate and the protective coating, or may use TPU to envelope and seal an RFID inlay on another type of flexible, semi-distortable substrate. In aspects in which TPU material is used to form the flexible substrate layer 104, a type of conductive ink that is compatible with TPU may be used to form the antenna 108. Such suitable conductive inks may include, but are not limited to, inks incorporating electrically conductive powders such as silver metal powder, alloys of silver metal powder, or mixtures thereof. In some aspects, the antenna 108 may be formed by a conductive ink type that retains a stretchable, elastic quality after application to the flexible substrate layer 104. This ensures that the circuit of the sensor 102 remains functional even when the sensor tag 100 is subjected to distortional stress.

In some aspects, the conductive ink may be applied to the substrate by screen printing, where the screen mesh size controls the thickness of the deposited thick film. In some alternative aspects, the conductive ink may be applied to the substrate by stencil printing, ink jet printing, or coating techniques. In one non-limiting aspect, for example, the conductive ink may be screen printed on a stretched substrate by dropping or depositing the conductive ink through a nozzle with a thickness of, e.g., 15 to 20 microns. In aspects where the stretched substrate is made of TPU, the substrate does not change shape after being released from the stretch, and therefore preserves the geometry of the antenna 108 that is printed thereon. In some aspect, the conductive ink may be a gelatinous liquid that does not spread beyond the intended printing area. In one non-limiting aspect, the antenna 108 formed by screen printing using a conductive ink may have a width of, e.g., 3 mm on a substrate having a width of 4 mm. In aspects where the sensor 102 includes an RFID sensor, a wider antenna may allow for a faster response time. In contrast, known systems that use a copper wire to form the antenna 108 are unable to provide a wide antenna. Since the antenna 108 in these aspects is formed by screen printing as opposed to chemical processes such as chemical etching, sustainability requirements are also satisfied.

As described herein, in some aspects where the flexible substrate layer 104 is made of TPU, the antenna 108 may be directly printed on TPU as the paste is interacting with TPU. Alternatively, in some aspects, an interlayer paste may be introduced on top of TPU, where the interlayer paste has a thickness of, for example, 25 microns to enable printing of the antenna 108 with silver ink and still maintain suppleness/flexibility. In some aspects, for example, a micro-silver ink may be used instead of or in addition to a nano-silver ink for screen printing the antenna 108 onto the TPU substrate.

In one non-limiting aspect, the antenna 108 may be formed in a meandering shape. Alternatively, the antenna 108 may be formed in a rectangular shape or as one or more straight strips of conductive ink. However, the shape of the antenna 108 is not limited to the above, and the antenna 108 may have a different shape or a combination of different shapes.

The applied conductive ink may then be oven dried or thermally cured. In one non-limiting aspect, for example, the conductive ink may be cured on a nylon or polyester fabric substrate through a progressive cure cycle. In this case, as the progressive cure cycle cures the conductive ink, the fabric substrate does not melt, while the conductive ink adheres to the fabric substrate but does not drain/seep through the fabric substrate.

In one non-limiting aspect, after the conductive ink is cured, a sensor chip may be configured on the flexible substrate layer 104 so as to make proper contact with the antenna 108 formed by the conductive ink. Then, a layer of polyurethane having a thickness of, e.g., about 50 microns, may be heat sealed (e.g., using a heat gun) to provide resistance/protection against abrasion, oil, water, grease, etc. In some aspects, the resulting sensor tag 100 may withstand, for example, two laundry washes at 30° C. with a typical detergent. In some aspects, the resulting sensor tag 100 may withstand processes such as ironing, bleaching, disinfecting, etc.

In an aspect, a plurality of sensor tags 100 described herein with reference to various aspects may be fabricated using an elongated single piece of substrate, which may be TPU, fabric, or fabric having a TPU film applied thereon. In an aspect, for example, a series of electronic components may be coupled to the substrate so as to be separated from each other with equal or unequal amounts of substrate. Then, a TPU coating layer may be applied to the entire length of the substrate which has the series of electronic components coupled thereon. The length of narrow substrate may then be cut into separate sensor tags 100 by an applicator machine at the time the sensor tags 100 are to be attached to an item.

In some aspects, as described herein with reference to various aspects, the one or more sensors 102 to be incorporated into the sensor tags 100 may be any type of sensor which can be produced with a relatively small, flat profile. In addition to the sensor types already described, the one or more sensors 102 may also include bio-sensors for detecting the physiological status of a person. For example, in an aspect, a sensor tag 100 embedded in a garment may include a sensor 102 configured to detect a wearer's heart rate. In another example aspect, a sensor tag 100 integrated into a garment may include a sensor 102 configured to sense a garment wearer's position (e.g., standing up, sitting, etc.). Other non-limiting example types of sensors 102 which can be incorporated into the sensor tag 100 are sensors which can sense the location of the wearer and/or the wearer's movement pattern (e.g., running, standing still, etc.). Suitable sensor implementations include, but are not limited to, a capacitive strain sensor, a conductive ink capacitive sensor, a conductive ink electrode sensor, a conductive ink resistive sensor, a fiber optic sensor, a metal electrode sensor, an optical sensor such as an optical probe sensor or an optical source sensor (e.g., a laser, a light emitting diode (LED), etc.), a piezo resistive strain gauge sensor, a semiconductor sensor (e.g., a force sensor, a gyroscope, a magneto-resistor sensor, a photodiode sensor, a phototransistor sensor, a pressure sensor, and/or a tri-axis accelerometer).

In some aspects, the sensor tag 100 described herein with reference to various aspects may have a flexible substrate layer 104 that is made of fabric (e.g., polyester, nylon, non-polyester material, etc.), TPU, rubber, etc.

In some aspect, the sensor tag 100 described herein with reference to various aspects may include an antenna 108 that is formed on the flexible substrate layer 104 using a conductive ink such as a silver or copper based ink. Unlike conventional sensor tags that implement an antenna using a wire that is either stitched or woven into a substrate and thus can easily be defeated or get disconnected, the antenna 108 in the present aspects is formed using a conductive ink and is therefore more robust. Further, conductive ink-based RFID sensors are relatively cheaper and faster to manufacture compared to RFID sensors with antennas formed with stitched thread or weaved thread into the substrate. In some aspect, the antenna 108 formed using a conductive ink on a fabric or TPU substrate is more flexible and less rigid and therefore causes less performance issues as compared to a copper thread woven or stitched into a substrate. For example, in cases where copper wire is woven or stitched into the substrate to form a conductor, wire stretch may cause a change in impedance and therefore may impact RFID read performance. In contrast, conductive ink based sensors are more robust to such stretch effects.

In some aspects where the flexible substrate layer 104 is made of fabric, the fabric may have a nylon taffeta or polyester taffeta weave that helps the conductive ink adhere on top of the substrate.

In some aspects where the flexible substrate layer 104 is made of fabric, the fabric may be a Polyurethane coated fabric (PU) that allows for forming the antenna 108 by deposition of conductive ink on the surface of the fabric without any seepage. In one non-limiting aspect, the coating layer 106 may be formed by applying another layer of such fabric on top of the base fabric on which the antenna 108 is printed. Accordingly, sealing/protection of the sensor 102 is provided by PU coating on the fabric against grease/oil, water, abrasion. Alternatively, the coating layer 106 may be formed by applying colorless or colored TPU on top of the fabric substrate on which the antenna 108 is printed. In an aspect, for example, colored TPU may be used for the coating layer 106 to hide the antenna 108. In some aspects, for example, the thicknesses of the fabric substrate may be varied as per a use profile related to the integration needs of a garment.

In some aspects where the flexible substrate layer 104 is made of a polyester/satin fabric coated with polyurethane (e.g., PU fabric), the temperatures for drying the conductive ink (e.g., silver) may be selected such that the PU does not soften and also the fabric does not burn.

In some aspects where the flexible substrate layer 104 is made of TPU, the thickness of the TPU substrate may vary from 100~200 microns. In some aspects, the TPU is a thermoset Polyurethane that is able to withstand drying the conductive ink (Silver) at some temperatures, but the TPU may thermally degrade at some higher temperatures. To laminate the TPU substrate for protection, a similar layer of TPU may be used having a same thickness or being thicker than the substrate to provide the coating layer 106.

In some aspects, the conductive ink used for forming the antenna 108 may be a conductive ink including silver nanoparticles in a solvent.

In some aspects, the sensor 102 may include a ceramic integrated circuit (IC, as provided by Impinj, NXP, EM, or a custom ASIC). The ceramic IC may include a chip loop antenna made of aluminum etched on PET material may have a pressure-sensitive adhesive such that the chip loop can be coupled to the antenna 108 formed on a fabric or TPU substrate.

In one aspect, for example, the sensor tag 100 may have small width, e.g., 5 mm, allowing it to be introduced in between a lap seam of a garment such as a t-shirt. The leap weave may be used to seal two pieces of cloth and may be between 4.8 mm and 5.2 mm. Accordingly, since the sensor tag 100 is integrated into a lap seam, the sensor tag 100 does not disturb the design of the garment. In contrast, conventional sensor tags that include copper wires may appear a protrusion and may be felt by a person wearing a garment to which that tag is attached. In some aspects, multiple flexible sensor tags 100 conforming to multiple frequency bands (e.g., European Union (EU) bands, North American bands, etc.) may be integrated into such a leap seam.

In one non-limiting example aspect, the flexible substrate layer 104 may be a strip of fabric substrate. Also, the coating layer 106 may be made of fabric, such as a PU cover with a 50 micron thickness, thus providing a fabric-on-fabric sensor tag 100. In this example aspect, the sensor tag 100 may be up to 4 mm wide and 136 mm long, with no curvature and no plasticized surface. Accordingly, the fabric-on-fabric sensor tag 100 may be supple but still maintain straightness, hence providing improvement over TPU-on-fabric sensor tags 100. Further, the fabric-on-fabric sensor tag 100 is more robust and therefore particularly suitable for feeding through fixtures. Additionally, the fabric-on-fabric sensor tag 100 maintains straightness thus better maintaining co-planarity and providing more consistent RFID reads. Yet further, the fabric-on-fabric sensor tag 100 does not impact the fall of a garment or interfere with design aesthetics. Additionally, the fabric-on-fabric sensor tag 100 may be water proof to a certain extent as the fabric is already coated with TPU.

In addition to the aspects disclosed herein, the above-described features, advantages and characteristics of the sensor tag 100 may be combined in any suitable manner in one or more additional aspects. One skilled in the relevant art will recognize, in light of the description herein, that the present solution can be practiced without one or more of the specific features or advantages of a particular aspect. In other instances, additional features and advantages may be recognized in certain aspects that may not be present in all aspects of the present solution.

Figure 5:
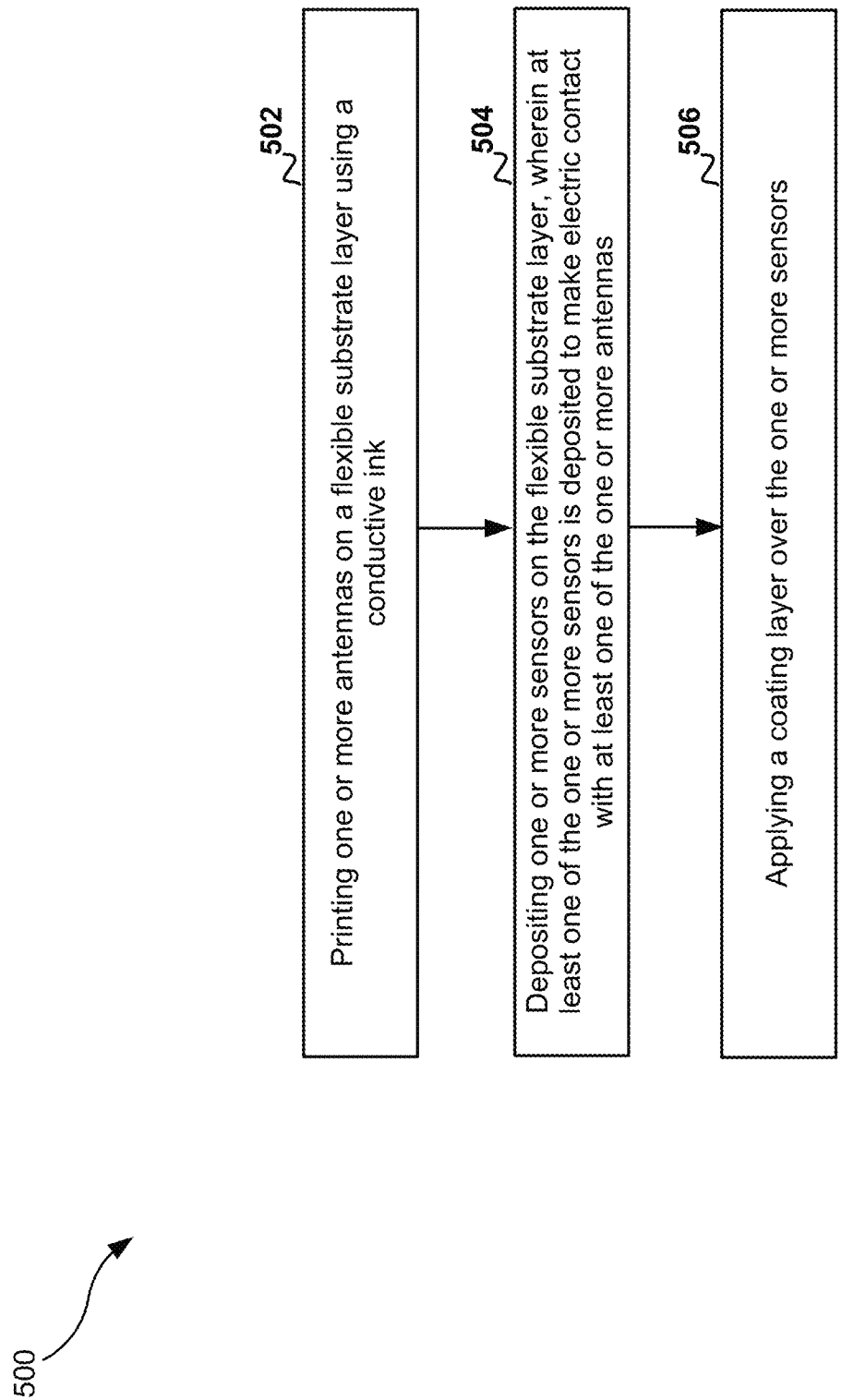
FIG. 5 is a flow diagram of an example method of configuring a sensor tag according to some present aspects.

FIG. 5 is a flow diagram of an example method of configuring a sensor tag according to some present aspects. At 502 the method 500 includes printing one or more antennas 108 on a flexible substrate layer 104 using a conductive ink. At 504 the method 500 includes depositing one or more sensors 102 on the flexible substrate layer 104, where at least one of the one or more sensors 102 is deposited to make electric contact with at least one of the one or more antennas 108. At 506 the method 500 includes applying a coating layer 106 over the one or more sensors 102.

In an aspect, for example, the coating layer 106 may include a colorless or colored TPU layer or a PU fabric layer.

In an aspect, for example, the flexible substrate layer 104 may include a TPU layer, a fabric layer, a PU fabric layer, a nylon taffeta layer, a polyester taffeta layer, or a rubber layer.

In an aspect, for example, the flexible substrate layer 104 may include a film of TPU over a fabric layer, in this aspect, the printing at 502 may include printing on the film of TPU, and the depositing at 504 may include depositing on the film of TPU. In an aspect, for example, the applying at 506 may include encapsulating the one or more sensors 102 between the TPU film and the coating layer 106. In an aspect, for example, the coating layer 106 may include TPU, and the applying at 506 may further include leaving a TPU-free margin around the flexible substrate layer 104.

In an aspect, for example, the flexible substrate layer 104 may include a fabric layer. In this aspect, the applying at 506 may include encapsulating the one or more sensors 102 and at least a portion of the fabric layer within the coating layer 106. In an aspect, for example, the coating layer 106 may include TPU. In this aspect, the applying at 506 may further include leaving a TPU-free margin around the fabric layer.

In an aspect, for example, the one or more sensors 102 may include an RFID sensor.

In an aspect, for example, the one or more sensors 102 may include an EAS sensor.

In an aspect, for example, the one or more sensors 102 may include an RFID sensor and an EAS sensor.

In an aspect, for example, the printing at 502 may include screen printing, stencil printing, ink jet printing, or coating.

In an aspect, for example, the printing at 502 may include printing at least a portion of the one or more antennas 108 in a stripe, rectangular, or meandering shape.

In an aspect, for example, the method 500 may further include curing the one of more antennas 108 subsequent to the printing at 502 and prior to the depositing at 504.

In an aspect, for example, the curing may include oven drying or thermally curing.

In an aspect, for example, the applying at 506 may include laminating or heat sealing.

In an aspect, for example, the laminating or heat sealing may include using a heat gun.

In an aspect, for example, the conductive ink may include conductive nanoparticles in a solvent.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for configuring a sensor tag, comprising:
   providing a flexible substrate layer;
   depositing a sensor inlay on the flexible substrate layer; and
   applying a protective coating layer of thermoplastic polyurethane (TPU) over the sensor inlay;
   wherein the applying further comprises leaving a TPU-free margin on the flexible substrate layer;
   wherein the sensor inlay comprises an integrated circuit (IC) connected to an antenna.

2. The method of claim 1, wherein the protective coating layer comprises a colorless or colored TPU layer.

3. The method of claim 1, wherein the flexible substrate layer comprises a TPU layer, a fabric layer, a Polyurethane coated (PU) fabric layer, a nylon taffeta layer, a polyester taffeta layer, or a rubber layer.

4. The method of claim 1, wherein the flexible substrate layer comprises a fabric layer; and
   wherein the applying comprises encapsulating the sensor inlay and at least a portion of the fabric layer within the protective coating layer leaving the TPU-free margin.

5. The method of claim 1, wherein the TPU-free margin is around the flexible substrate layer.

6. The method of claim 1, wherein the sensor inlay comprises a radio-frequency identification (RFID) sensor.

7. The method of claim 1, wherein the sensor inlay is configured to provide flexibility so as to be repeatedly stretched or deformed without damaging functionality of the sensor inlay.

8. The method of claim 1, wherein the sensor inlay comprises an Electronic Article Surveillance (EAS) sensor or a radio-frequency identification (RFID) sensor.

9. The method of claim 1, wherein the TPU is configured to change states when an outside temperature source is applied.

10. The method of claim 9, wherein the sensor inlay wherein the sensor inlay adheres, cures, laminates or seals with the TPU in combination with the flexible substrate layer.

11. The method of claim 1, wherein the applying further comprises encapsulating the sensor inlay between the flexible substrate layer and the protective coating layer.

12. A sensor tag comprising:
    a flexible substrate layer;
    a sensor inlay on the flexible substrate layer; and
    a protective coating layer of thermoplastic polyurethane (TPU) over the sensor inlay;
    wherein the protective coating layer includes a TPU-free margin on the flexible substrate layer; and
    wherein the sensor inlay comprises an integrated circuit (IC) connected to an antenna.

13. The sensor tag of claim 12, wherein the antenna is formed using a conductive ink.

14. The sensor tag of claim 13, wherein the protective coating layer comprises a colorless or colored TPU layer.

15. The sensor tag of claim 13, wherein the flexible substrate layer comprises a TPU layer, a fabric layer, a Polyurethane coated (PU) fabric layer, a nylon taffeta layer, a polyester taffeta layer, or a rubber layer.

16. The sensor tag of claim 13, wherein the flexible substrate layer comprises a film of TPU.

17. The sensor tag of claim 13, wherein the protective coating layer encapsulates the sensor inlay and at least a portion of the flexible substrate layer leaving the TPU-free margin.

18. The sensor tag of claim 13, wherein the sensor inlay is configured to provide flexibility so as to be repeatedly stretched or deformed without damaging functionality of the sensor inlay.

19. The sensor tag of claim 13, wherein the sensor inlay comprises an Electronic Article Surveillance (EAS) sensor or a radio-frequency identification (RFID) sensor.

20. The sensor tag of claim 13, wherein the TPU is configured to change states when an outside temperature source is applied.

21. The method of claim 1, wherein the antenna is formed using a conductive ink.

22. The sensor tag of claim 20, wherein the sensor inlay wherein the sensor inlay adheres, cures, laminates or seals with the TPU in combination with the flexible substrate layer.

* * * * *